US012809646B2

(12) United States Patent
Ajmeer

(10) Patent No.: US 12,809,646 B2
(45) Date of Patent: Nov. 24, 2026

(54) METHOD FOR POWER STATES IN VEHICLES

(71) Applicant: Harman International Industries, Incorporated, Stamford, CT (US)

(72) Inventor: Ahamed Rafik Ajmeer, Bangalore (IN)

(73) Assignee: HARMAN INTERNATIONAL INDUSTRIES, INCORPORATED, Stamford, CT (US)

(*) Notice: Subject to any disclaimer, the term of this patent is extended or adjusted under 35 U.S.C. 154(b) by 282 days.

(21) Appl. No.: 18/713,141

(22) PCT Filed: Nov. 24, 2021

(86) PCT No.: PCT/US2021/072607
§ 371 (c)(1),
(2) Date: May 23, 2024

(87) PCT Pub. No.: WO2023/096659
PCT Pub. Date: Jun. 1, 2023

(65) Prior Publication Data
US 2025/0021351 A1 Jan. 16, 2025

(51) Int. Cl.
*G06F 1/3287* (2019.01)
*G06F 9/448* (2018.01)
*H04W 4/40* (2018.01)

(52) U.S. Cl.
CPC .......... *G06F 9/4498* (2018.02); *G06F 1/3287* (2013.01); *H04W 4/40* (2018.02)

(58) Field of Classification Search
None
See application file for complete search history.

(56) References Cited

U.S. PATENT DOCUMENTS 6,735,502 B2 * 5/2004 Phillips .................. F02D 41/22 903/917
9,082,073 B2 * 7/2015 Miller ...................... G06N 5/02
(Continued)

FOREIGN PATENT DOCUMENTS

WO 2009133489 A1 11/2009

OTHER PUBLICATIONS

"Low-power FSM synthesis," Wikipedia Website, Available Online at https://en.wikipedia.org/wiki/Low-power_FSM_synthesis, Page Created Apr. 22, 2015, 2 pages.
(Continued)

*Primary Examiner* — Philip Wang
(74) *Attorney, Agent, or Firm* — McCoy Russell LLP

(57) ABSTRACT

Systems and methods are provided for managing power states of electronic control units (ECUs) of a vehicle. A method may include receiving a command at the vehicle in a language for establishing parts of state machines, and identifying the command as being for the configuration of state machine transitions for power states of one or more ECUs of the vehicle, based on a value of a command-type field of the command. For commands identified as being for the configuration of state machine transitions, the method may further include configuring a transition of a state machine based on a value in a start-state field of the command, a value in an end-state field of the command, and: one or more values in a trigger-condition field of the command, zero or more values in a guard-condition field of the command, and/or zero or more values in an action field of the command.

20 Claims, 8 Drawing Sheets

(56) References Cited

U.S. PATENT DOCUMENTS

| | | | |
|---|---|---|---|
| 10,136,504 B2 | 11/2018 | Lyons et al. | |
| 11,649,790 B1 * | 5/2023 | Liu | F02M 31/13 123/179.21 |
| 12,417,114 B2 * | 9/2025 | Van Wijk | G06F 9/45558 |
| 2003/0098187 A1 * | 5/2003 | Phillips | B60W 20/50 903/917 |
| 2014/0265842 A1 | 9/2014 | Potucek et al. | |
| 2016/0339925 A1 * | 11/2016 | Lindstrand | H04L 12/40039 |
| 2018/0035514 A1 | 2/2018 | Fournier et al. | |
| 2018/0217648 A1 * | 8/2018 | Flynn | G06F 1/3296 |
| 2020/0077497 A1 * | 3/2020 | Diep | H05B 45/37 |
| 2021/0184810 A1 * | 6/2021 | Bai | H04L 5/0096 |
| 2021/0215104 A1 * | 7/2021 | Darby | F02C 9/00 |
| 2023/0030985 A1 * | 2/2023 | Petry | G06F 1/3287 |
| 2024/0416960 A1 * | 12/2024 | Paxton | B60W 60/0011 |
| 2026/0135929 A1 * | 5/2026 | Shribman | H04L 67/60 |

OTHER PUBLICATIONS

ISA European Patent Office, International Search Report and Written Opinion Issued in Application No. PCT/ US2021/052834, Mar. 28, 2022, WIPO, 24 pages.

* cited by examiner

METHOD FOR POWER STATES IN VEHICLES

CROSS-REFERENCE TO RELATED APPLICATIONS

The present application is a U.S. National Phase of International Application No. PCT/US2021/072607, entitled "METHOD FOR POWER STATES IN VEHICLES", and filed on Nov. 24, 2021. The entire contents of the above-listed application are hereby incorporated by reference for all purposes.

FIELD

The disclosure relates to power states for electronic control units of connected vehicles.

BACKGROUND

A vehicle may include one or more electronic control units (ECUs). An ECU is an embedded system (e.g., a computer system including a processor, a memory, and input/output functionality) which may control operation of one or more components of the vehicle. For example, a vehicle may contain such ECUs as a door control unit (DCU), a powertrain control module (PCM), a speed control unit (SCU), and a telematics control unit (TCU), among others, where a DCU may control and monitor various electronic accessories in a vehicle's door, a PCM may control and monitor functions of the transmission and the engine of the vehicle, an SCU may control cruise control functionality of a vehicle, and a TCU may control wireless connectivity of the vehicle to cloud services, respectively.

Each ECU of a vehicle may operate in a variety of allowable power states, which may correspond with various operating states and/or power modes of the respective ECUs. For example, a TCU may have power states such as active, net off, standby, low power active, deep sleep, backup battery (BUB) active, and/or BUB standby. Power states for ECUs, and transitions between power states of the ECUs (which may be associated with one or more trigger conditions, one or more guard conditions, and/or one or more actions), may come pre-defined via power management software for the operation of said ECUs. The power states and the transitions between them may be in line with the system design and the vehicle architecture.

Power states, and the transitions between them, may in some examples be represented as and/or implemented by a finite state machine (FSM) data structure within power management software of the ECUs. Changing such power-management state machines—such as by removing transitions between existing power states of an ECU, adding new transitions between existing power states of an ECU, or adding a new power state of an ECU and transitions associated with it—may be accomplished through a software-update framework, by "flashing" a new power-management software update or power-management software package (e.g., committing an update or package to memory, such as a non-volatile memory). The update or package may be received remotely at the vehicle via a wireless connection between the vehicle and an operator or manager of the vehicle. In a software-update framework, some software updates or software packages for power management may merely be applicable for a limited number of cars, which may lead to the proliferation of distinct power-management software profiles to be maintained. Moreover, vehicles of the same make and model may be used in ways that are not all optimally addressed by a single power-management software profile.

SUMMARY

The methods, mechanisms, and systems disclosed herein may use a command-based framework for the configuration of power states for a power-management state machine, for example a finite state machine (FSM), in one or more ECUs of a vehicle. This command-based framework may allow addition, removal, and/or modification of power states, as well as the addition, removal, and/or modification of various trigger conditions, guard conditions, and actions associated with transitions. The command-based framework may include receiving commands (e.g., wirelessly) to configure available power states for one or more ECUs of the vehicle, and/or to configure transitions between the power states of the one or more ECUs.

This may provide a unified, command-based framework for dynamic updating of power states of ECUs and transitions therein, which may be used for a variety of vehicles. Using the command-based framework, states and state transitions of a power-management state machine may advantageously be maintained with relative ease across makes, models, and even usage-models or driving patterns (e.g., whether a vehicle is used as part of a taxi fleet, or is for city use, et cetera), in order to minimize energy consumption by the ECUs during vehicle usage. Commands to update power-management state machines may be provided by an operator or manager of a fleet of vehicles to configure the power states of the vehicles therein.

In some embodiments, the issues described above may be addressed by a method comprising receiving a command (e.g., wirelessly transmitted to an ECU of the vehicle) in a language for establishing parts of state machines (e.g., power-management state machines defining power states of an ECU and transitions therebetween), and identifying the command as being for the configuration of state machine transitions based on a value of a command-type field of the command. For commands identified as being for the configuration of state machine transitions, the method may include configuring a transition of a state machine based on a value in a start-state field of the command, a value in an end-state field of the command, and one or more values in a trigger-condition field of the command, zero or more values in a guard-condition field of the command, and/or zero or more values in an action field of the command. In this way, by receiving a command for assembling a power-management state machine for managing power states of an ECU, the power states of the ECU may be adapted without the disadvantages of a software-update framework (e.g., software flashing).

In other embodiments, the issues described above may be addressed by a system for the configuration of power-management state machines for a vehicle. The system may comprise one or more processors (e.g., of an ECU of the vehicle) and a non-transitory memory having executable instructions that, when executed, cause the one or more processors to receive a command from a wireless communications link (such as from an operator or manager of a fleet of vehicles), the command being in a language for establishing parts of power-management state machines (e.g., power-management state machines defining power states of an ECU and transitions therebetween). The received command may be based upon one or more of a make of the vehicle, a model of the vehicle, and a usage-model of the vehicle, such that the power states of ECUs of the vehicle and the transitions therebetween may be configured in order minimize energy use, according to properties specific to the vehicle. The command may be identified as being for the configuration of state machine transitions based on a value of a command-type field of the command. For commands identified as being of a type for configuration of transitions, a transition of a state machine may be configured based on a value in a start-state field of the command, a value in an end-state field of the command, and at least one of: one or more values in a trigger-condition field of the command, zero or more values in a guard-condition field of the command, and zero or more values in an action field of the command. In this way, by receiving and implementing commands for the configuration of state machines of an ECU, with the commands being based on properties of the vehicle, the operation of ECUs in the vehicle may be adapted to minimize excess power usage during vehicle operation.

In yet other embodiments, the issues described above may be addressed by a system for the configuration of power-management state machines for a remote vehicle. A remote vehicle may be a vehicle that may have one or more processors of the vehicle in communication with an external entity (e.g., one or more of an original equipment manufacturer (OEM), an operator or manager of a fleet of vehicles, and/or a software provider) via a wireless communications link. The system may comprise a wireless communications link with a vehicle, one or more processors (such as processors of ECUs of the vehicle), and a non-transitory memory having executable instructions that, when executed, cause the one or more processors to prepare one or more first commands and one or more second commands, each of the one or more first commands and the one or more second commands being in a language for establishing parts of power-management state machines of vehicles. The one or more first commands may include command-type fields that have predetermined values from a table of commands that correspond with one or more of: the configuration of available states (e.g., power states of the ECU), the configuration of available trigger conditions, the configuration of available guard conditions, and the configuration of available actions. The available trigger conditions, guard conditions, and actions may be utilized for defining transitions between the available power states of the ECU. The available power states of the ECU may depend on the hardware architecture, hence the available power states and the associated trigger conditions, guard conditions, and/or actions may be pre-defined, and available as part of the one or more first commands. The one or more second commands may include command-type fields that have a predetermined value from the table of commands that corresponds with the configuration of power-management state machine transitions. The first commands and the second commands are for transmission to the vehicle across the wireless communications link, and the one or more first commands and the one or more second commands are based upon at least one of: a make of the vehicle, a model of the vehicle, and a usage-model of the vehicle (e.g., used as part of a taxi fleet, for city use, et cetera). In this way, by utilizing one or more first commands and one or more second commands to configure power-management state machines and transitions therein for ECUs of a vehicle via the commands sent to the vehicle via a wireless communications link, excess power usage for ECUs of a vehicle may be reduced on the fly.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1A:
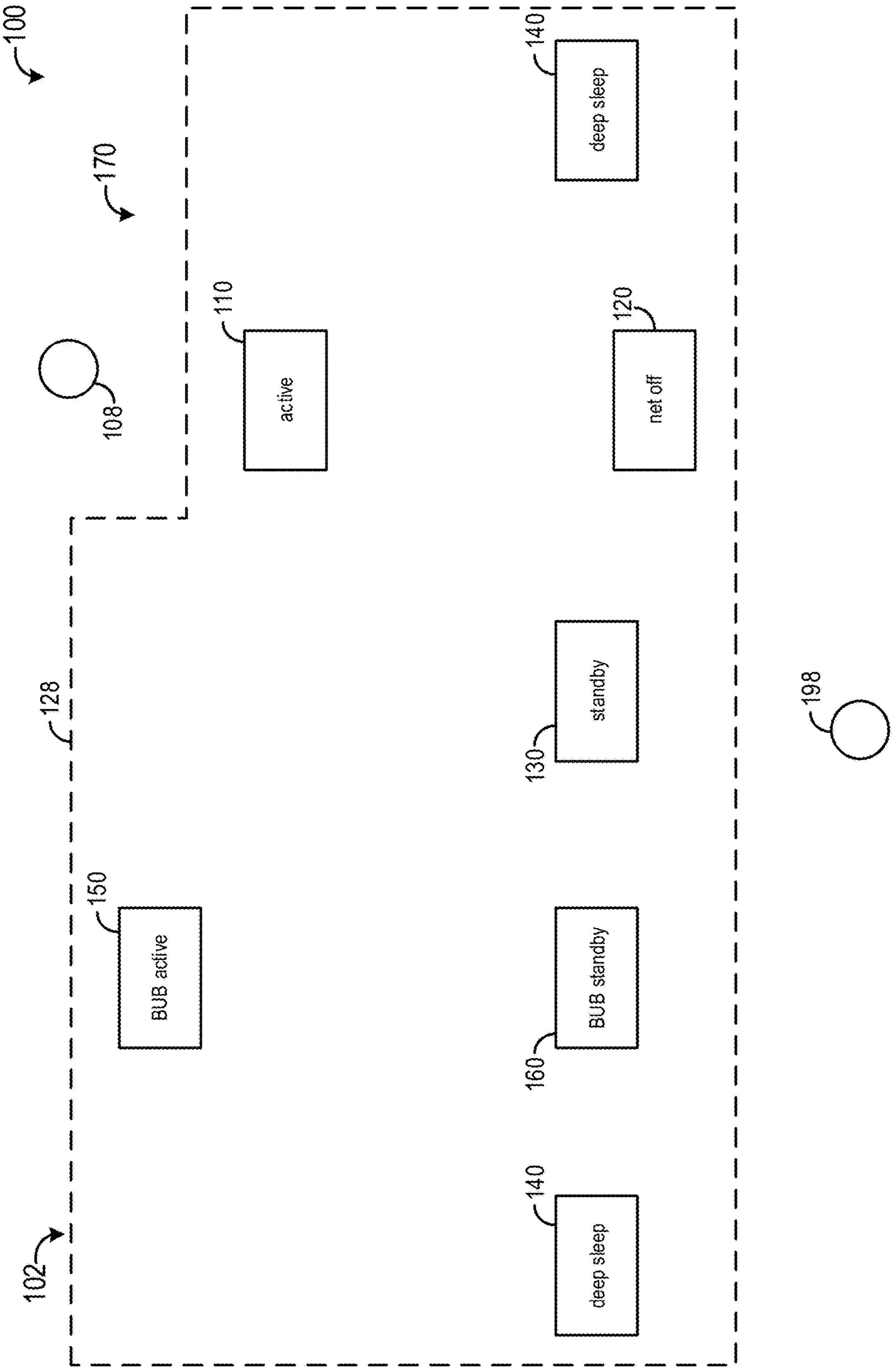
FIG. 1A shows a plurality of available power states for a telematics control unit (TCU) of a vehicle, in accordance with one or more embodiments of the present disclosure.

Disclosed herein are mechanisms, methods, and systems for configuring power management state machines, e.g. finite state machines (FSMs), of electronic control units (ECUs) in vehicles. Various ECUs of a vehicle may make up a vehicular network of the vehicle. An ECU within the vehicular network may operate within a plurality of available power states, and a current power state may be selected according to a current operating mode of the ECU. During operation of the vehicle, it may be desirable for one or more ECUs to manage their transitions between power states, based on the operating specifications of the one or more ECUs and the available power supplied to the one or more ECUs, in order to minimize a power usage associated with the maintenance of various functions of the one or more ECUs during vehicle operation.

The power states of an ECU may be pre-defined in accordance with the system design and/or the vehicle architecture. During vehicle operation, an ECU may transition from one power state to another based on trigger conditions and/or guard conditions to be satisfied by the ECU and/or one or more components of the vehicle interacting with the ECU. The transition may be associated with one or more actions to be taken during the transition.

However, in some circumstances, it may be desirable to adaptively add or modify one or more elements of a power management state machine (e.g., power states, as well as trigger conditions, guard conditions, and/or actions associated with transitions between power states) during vehicle operation based on the operating conditions of the vehicle, in order minimize power consumption of one or more ECUs of the vehicular network. One method to add or modify one or more elements of a state machine is via a software-update framework. However, updating of the elements of power-management state machines for a fleet of vehicles via a software-update framework may be dependent on the ability and will of the operator or manager of the fleet of vehicles to adapt and maintain the related software-update framework, which may prove to be costly and time inefficient. Hence, an adaptive, easily configurable, and updatable command-based framework for power states for ECUs of vehicles and transitions therein may be desirable.

In one example, the aforementioned complications may be resolved with a method for adaptively adding, removing, and modifying states and/or transitions between states of one or more ECUs of a vehicle, the method comprising receiving a command in a language for establishing parts of state machines, and identifying the command as being for the configuration of state machine transitions based on a value of a command-type field of the command. For commands identified as being for the configuration of state machine transitions, the method may comprise configuring a transition of a state machine based on a value in a start-state field of the command, a value in an end-state field of the command, and at least one of: one or more values in a trigger-condition field of the command, zero or more values in a guard-condition field of the command, and zero or more values in an action field of the command.

In this way, by using a command-based framework that allows for adaptive alteration of power states of a state machine, as well as adaptive alteration of trigger conditions, guard conditions, and actions associated with transitions between the power states, power usage of ECUs in a vehicular network may be adaptively minimized. By receiving commands for the configuration of transitions of state machines, the command-based framework may easily allow for changes to power-management state machines without the use of a software-update framework. Additionally, the use of a command-based framework may be applicable to a wide variety of makes, models, and/or usage models of vehicles, which may advantageously aid an original equipment manufacturer (OEM) in configuring the power states of vehicles in runtime.

Figure 1B:
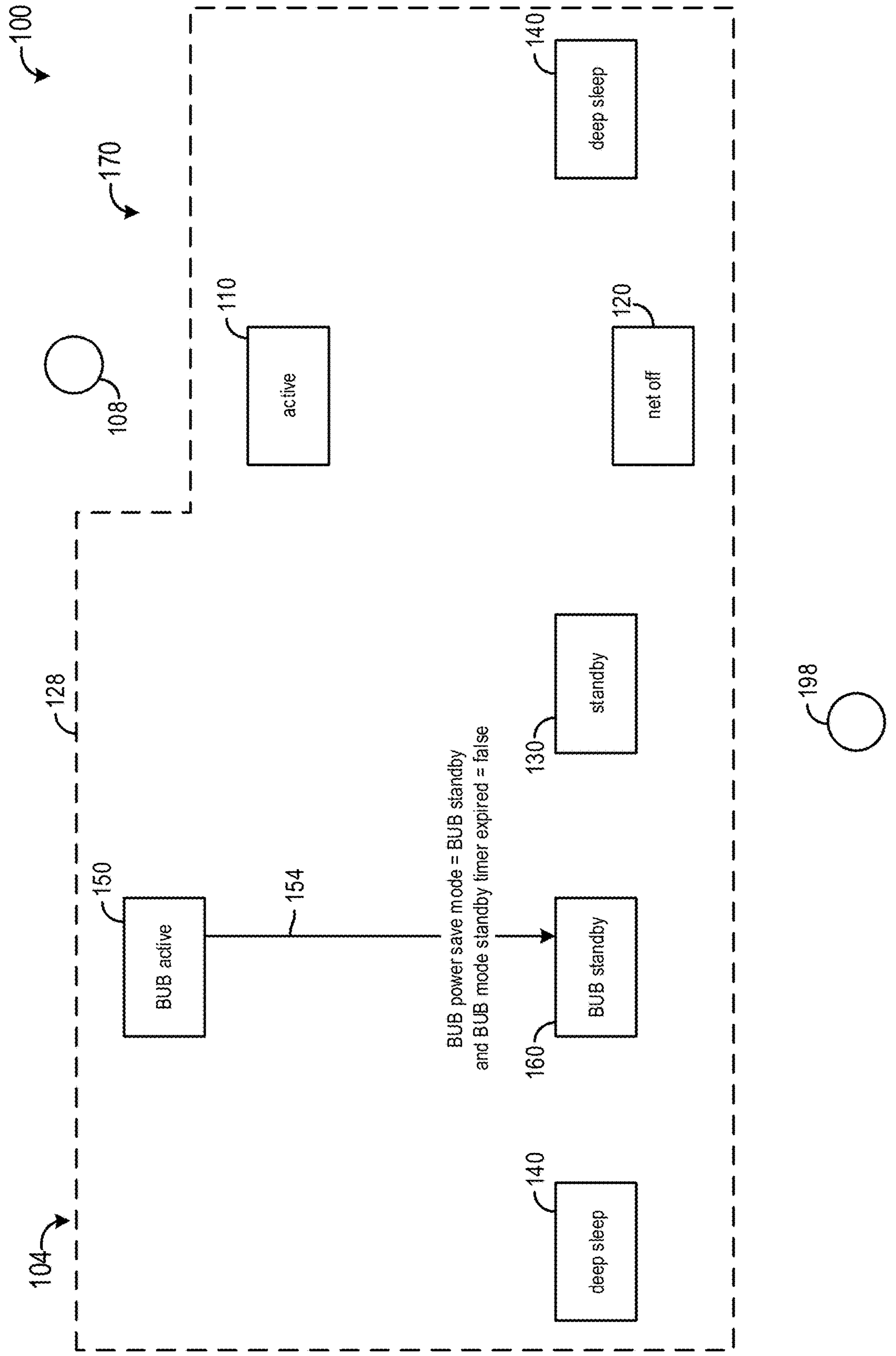
FIG. 1B shows the plurality of available power states of FIG. 1A, including a state machine transition defined between two power states, in accordance with one or more embodiments of the present disclosure.
Figure 1C:
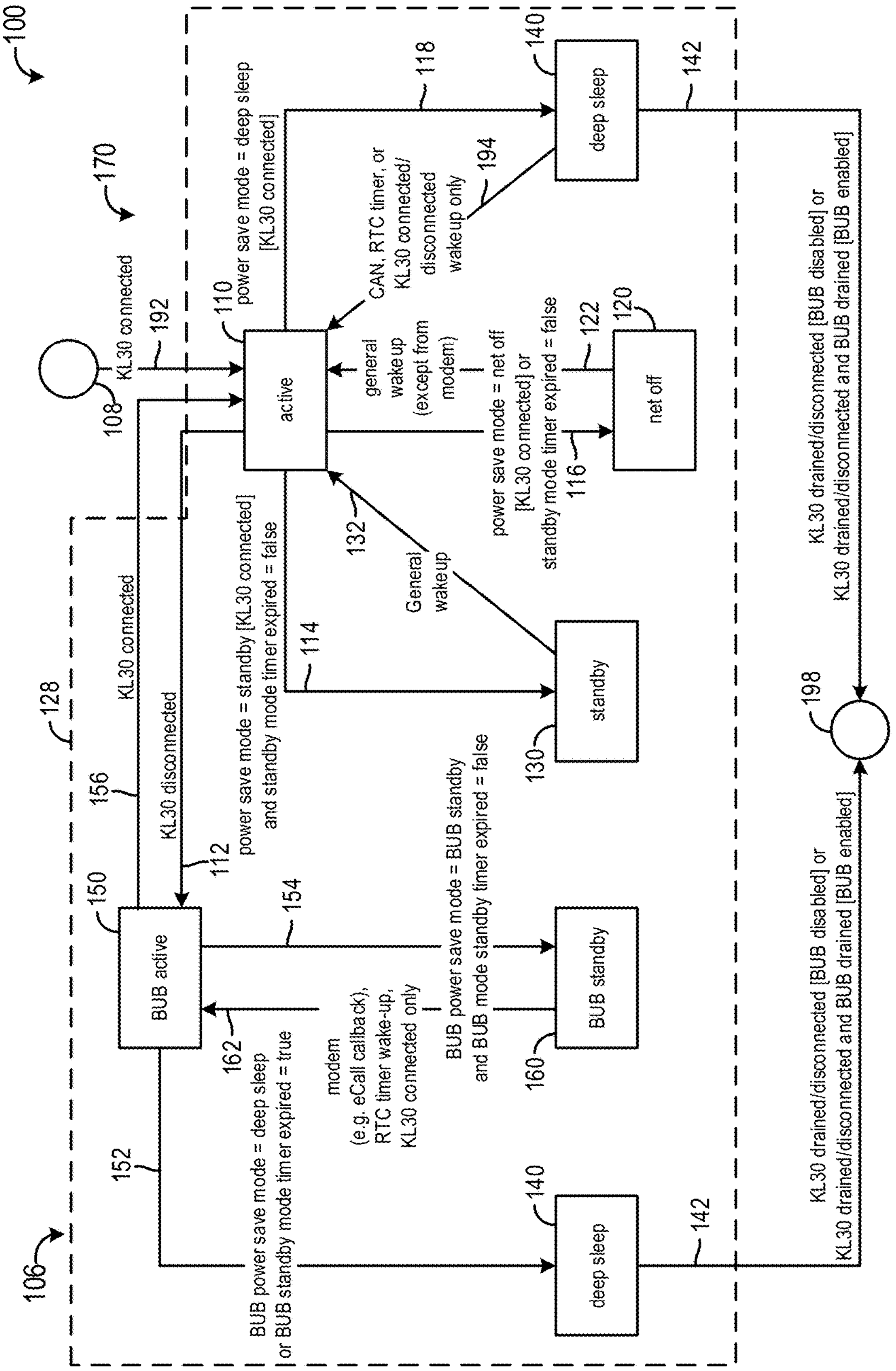
FIG. 1C shows the plurality of available power states of FIG. 1A, including a plurality of state machine transitions defined between power states, in accordance with one or more embodiments of the present disclosure.

An example plurality of power states for an FSM of a telematics control unit (TCU), a particular type of ECU, is shown in FIG. 1A. Transitions between power states of an ECU may come with a one or more actions associated with the transition, and a transition between two power states may be initiated following certain trigger conditions having happened, if certain guard conditions are also satisfied. FIG. 1B shows the plurality of power states with an example transition between two power states of the plurality of power states, the transition including one or more guard conditions and one or more trigger conditions. FIG. 1C shows the plurality of power states including a plurality of transitions therein, in which each transition may include one or more guard conditions and/or one or more trigger conditions.

Figure 2:
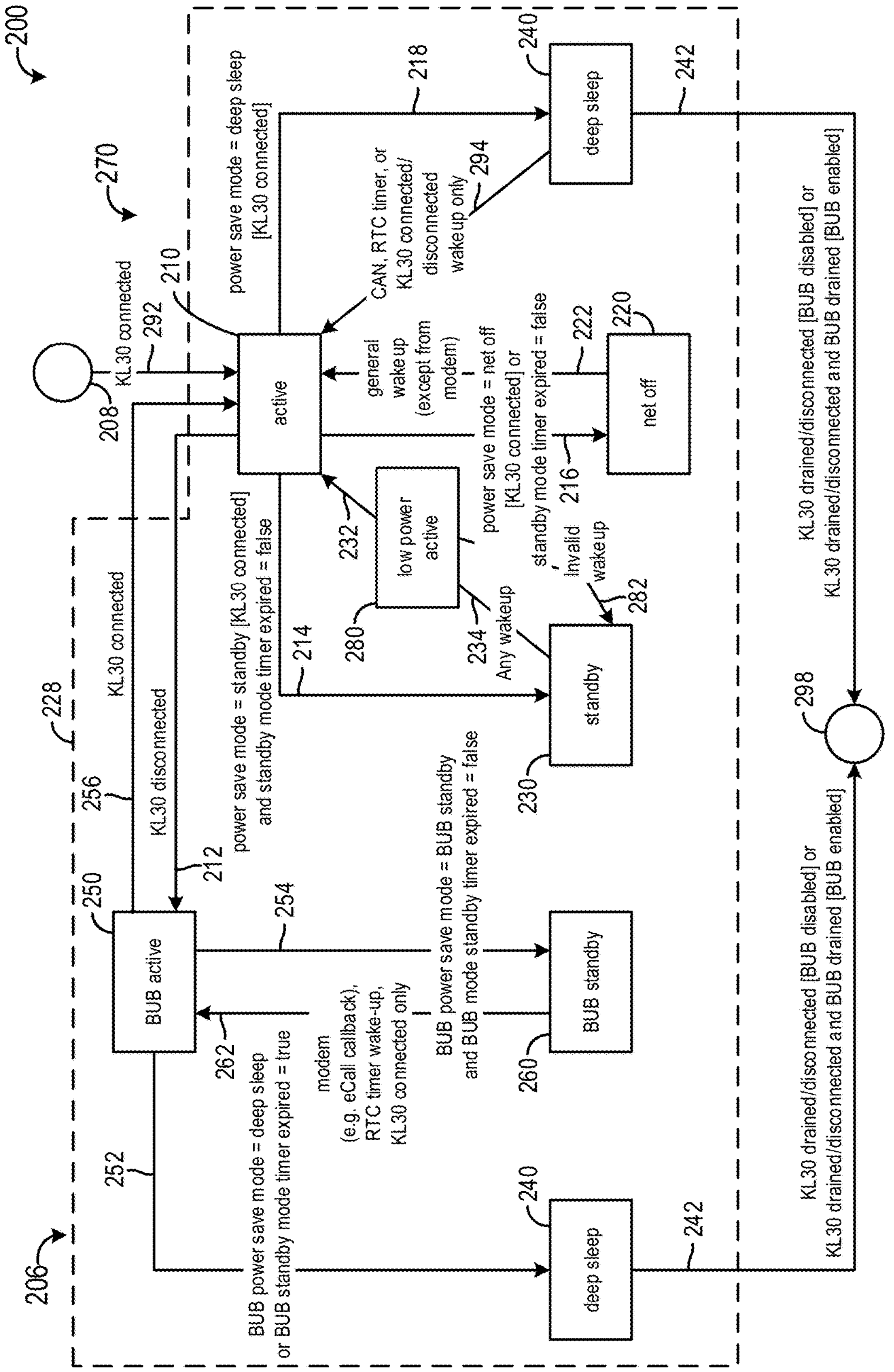
FIG. 2 shows another plurality of available power states for a TCU, including a plurality of state machine transitions defined between power states similar to FIG. 1C, as well as an additional power state and transitions associated with the additional power state, in accordance with one or more embodiments of the present disclosure.

Upon configuration of the plurality of power states and configuration of the plurality of transitions therebetween, additional power states may be added or removed, and corresponding transitions between power states may also be added or removed. FIG. 2 illustrates an example of adding a power state to the FSM of FIG. 1C, including adding transitions between the added power state and one or more of the existing power states of FIG. 1C.

Figure 3:
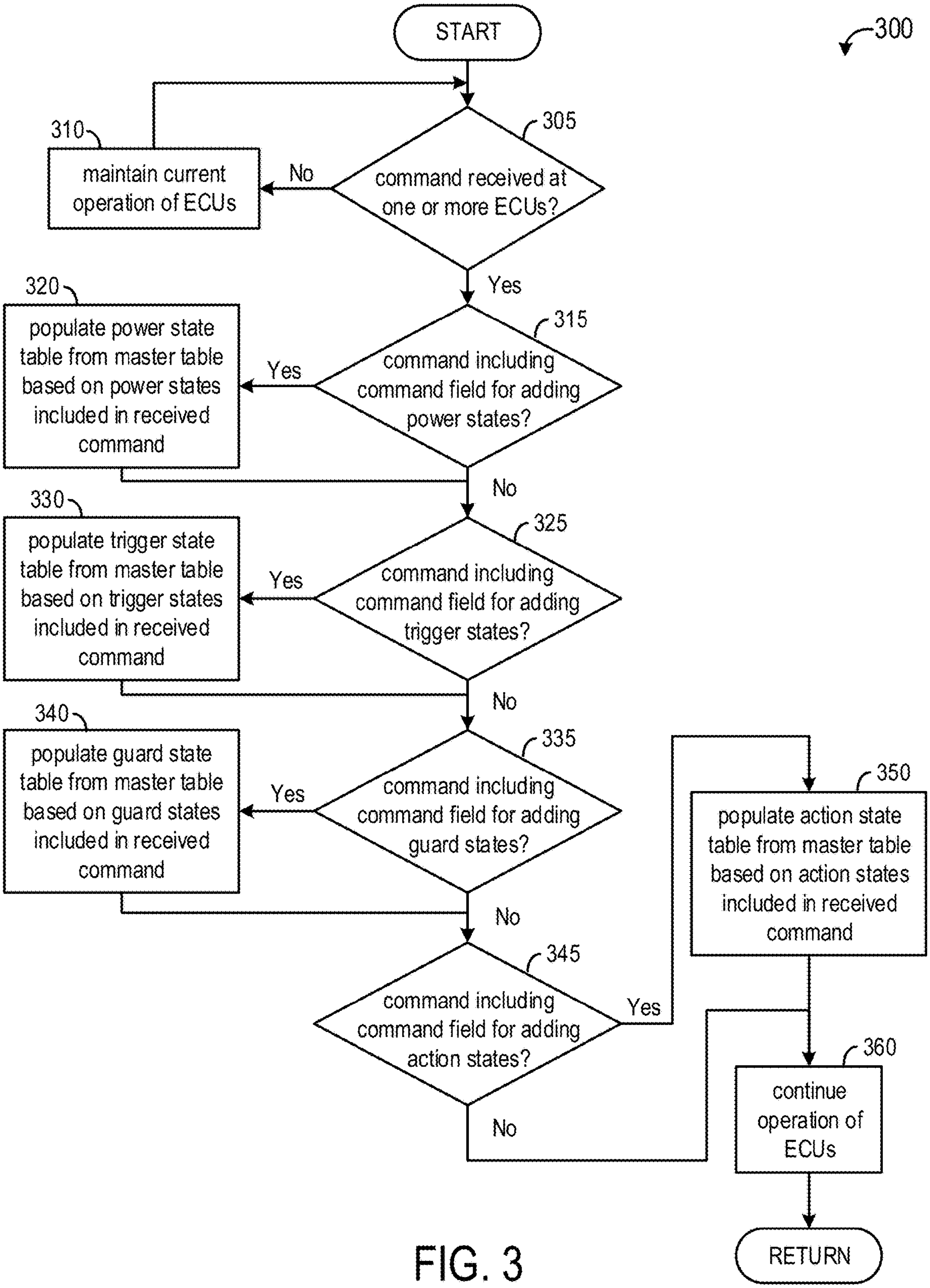
FIG. 3 shows a method for initializing tables of available power states, guard conditions, trigger conditions, and actions for use in the configuration of a power management state machine of an ECU, in accordance with one or more embodiments of the present disclosure.
Figure 4:
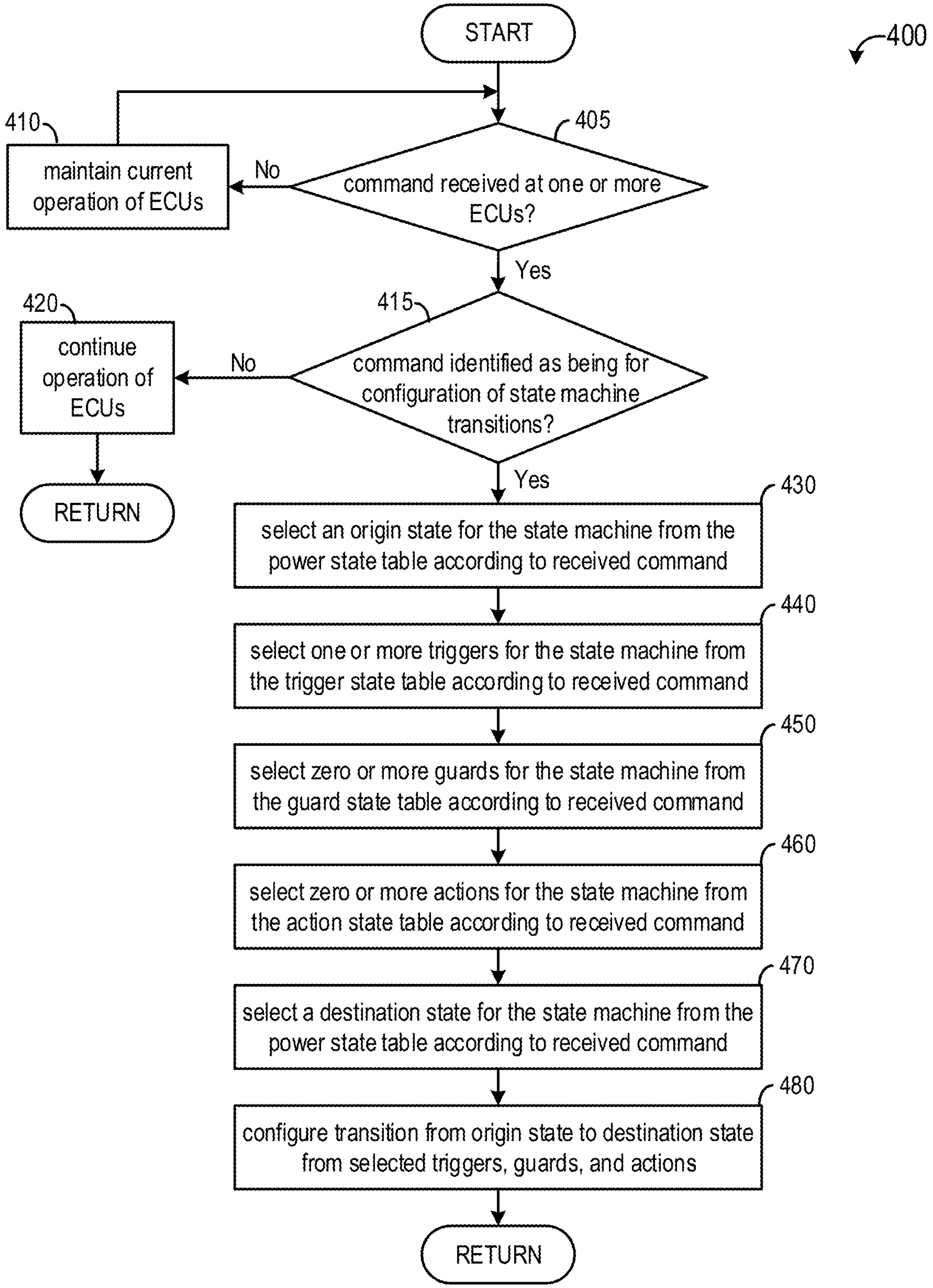
FIG. 4 shows a method for configuring transitions between two power states of a power management state machine of an ECU based on tables of available power states, guard conditions, trigger conditions, and actions, in accordance with one or more embodiments of the present disclosure.
Figure 5:
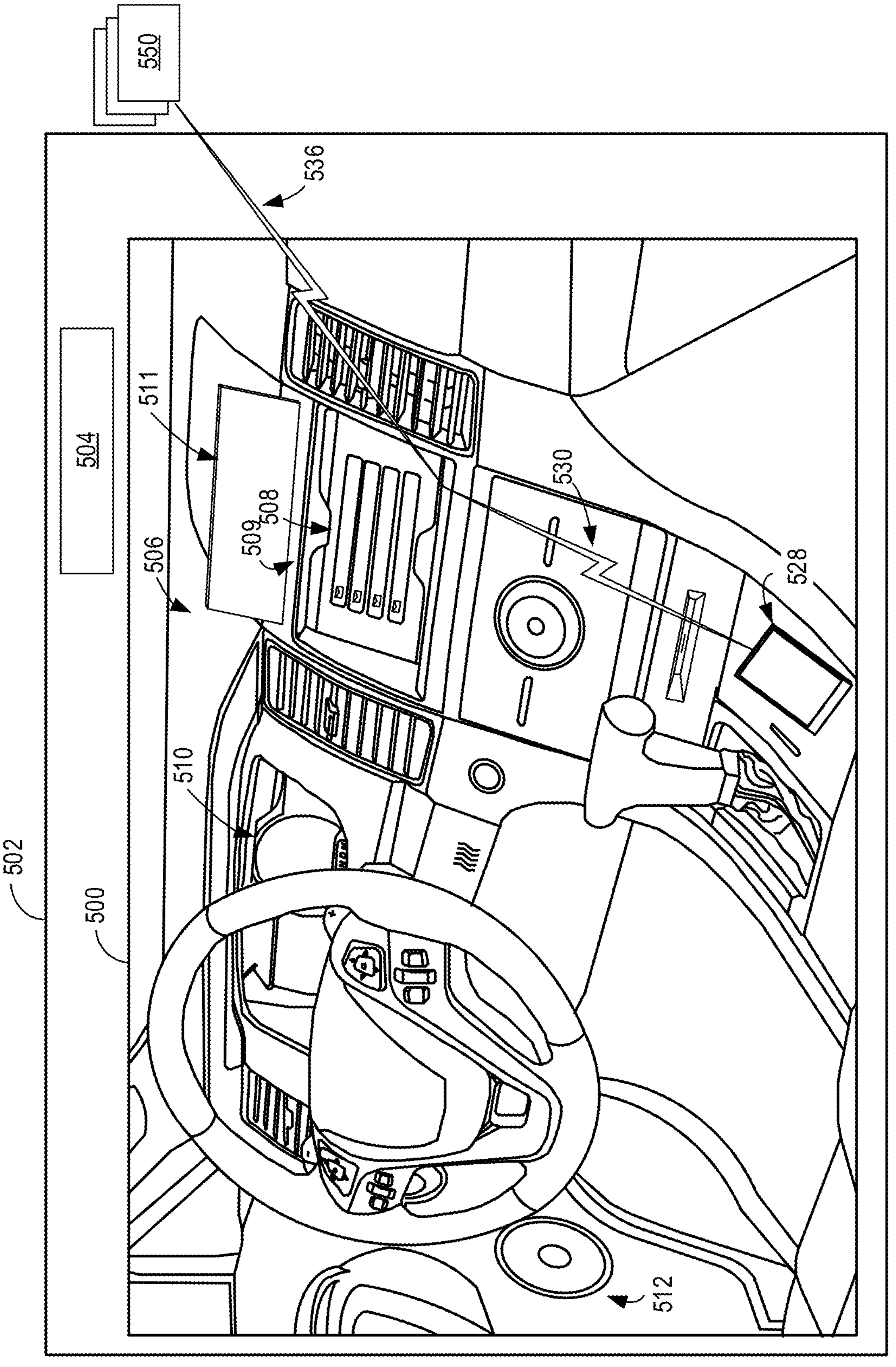
FIG. 5 shows a partial view of a vehicle cabin, in accordance with one or more embodiments of the present disclosure.
Figure 6:
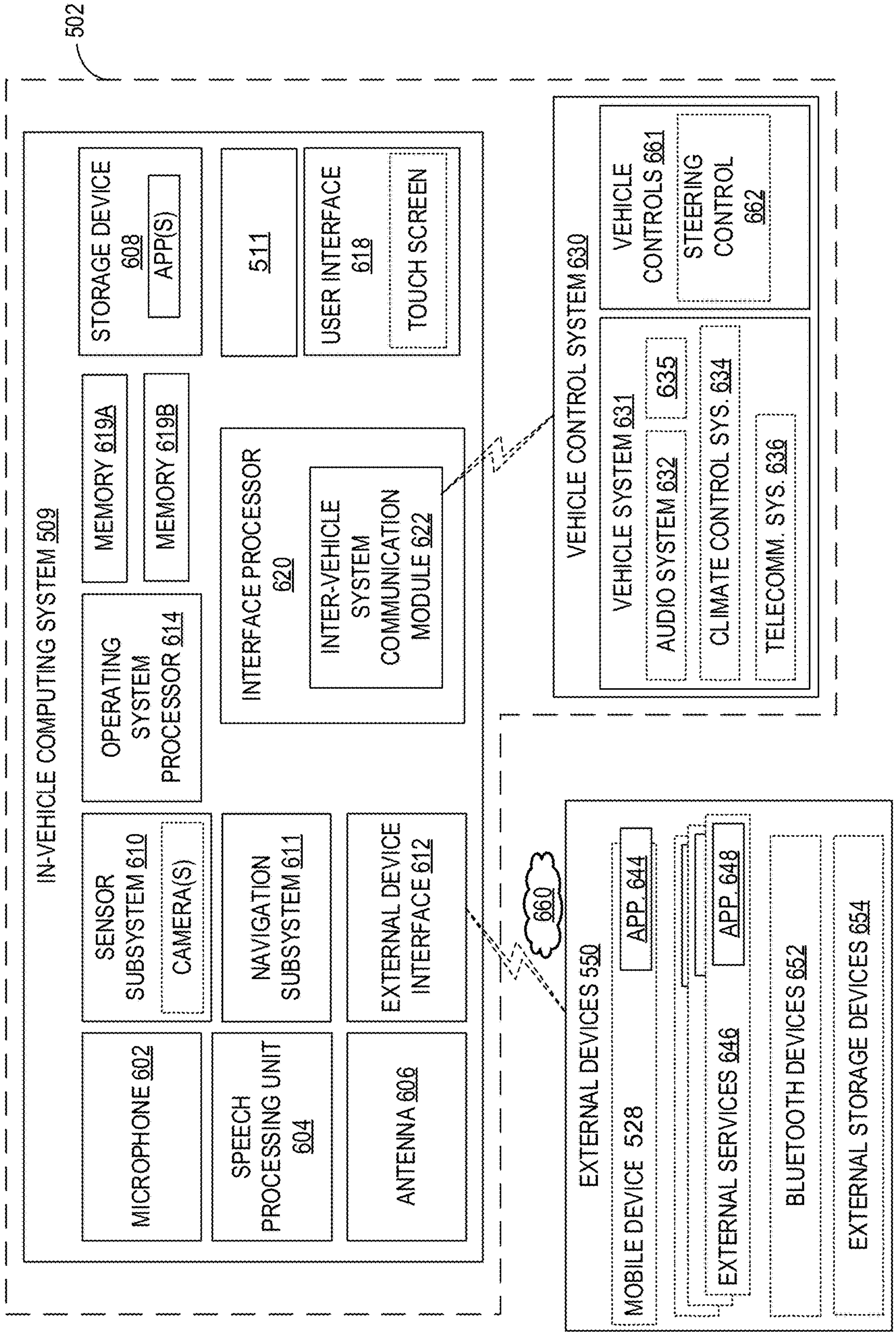
FIG. 6 shows a block diagram of an in-vehicle computing system, in accordance with one or more embodiments of the present disclosure.

In order to configure an FSM of an ECU of a vehicle, the vehicle may first initialize tables for available power states, available trigger conditions, available guard conditions, and available actions for the FSM to use during operation, these tables being configured based on commands received wirelessly from, e.g., an operator or manager of a vehicle fleet. FIG. 3 shows a method for initializing the aforementioned tables based on commands received, while FIG. 4 shows a method for configuring transitions of an FSM of the ECU from the aforementioned tables based on commands received. The ECUs may be included as part of a plurality of ECUs of a vehicular network. FIG. 5 shows an example of a cabin of the vehicle, while FIG. 6 shows an example of an in-vehicle computing system, the in vehicle-computing system including one or more ECUs.

FIGS. 1A through 1C show a power-management state machine 100, including a plurality of available power states 170 and transitions therebetween, of a TCU of a vehicle. The vehicle may be an internal-combustion based vehicle, a battery electric vehicle (BEV), a hybrid electric vehicle (HEV), a plug in electric vehicle (PHEV), or a vehicle of another type, as described in relation to FIGS. 5 and 6. The TCU may include an embedded system on board of the vehicle that wirelessly connects the vehicle to cloud services or other vehicles, e.g., via vehicle to everything (V2X) standards over a wireless network. In various embodiments, the TCU may include: a global navigation system (GNSS) unit, which keeps track of the latitude and longitude values of the vehicle; an external interface for mobile communication (e.g., the global system for mobile communications (GSM), ground penetrating radar systems (GPRS), Wi-Fi, worldwide interoperability for microwave access (WiMax), long-term evolution (LTE), or fifth generation mobile network (5G)), which provides the tracked values to a centralized geographical information system (GIS) database server; an electronic processing unit, such as a microcontroller or a microprocessor or field programmable gate array (FPGA), which processes the information and acts on the interface between the global positioning system (GPS); and/or a mobile communication unit; and some amount of memory (e.g., for saving GPS values in case of mobile-free zones or to intelligently store information about the vehicle's sensor data).

FIG. 1A illustrates a first embodiment 102 of the state machine 100, including the available power states 170, without any transitions. The TCU may be one example of an ECU of a vehicle, and the first embodiment 102 of the state machine 100 may be taken as a non-limiting embodiment of a plurality of available power states of an ECU; other pluralities of available power states for other ECUs may be possible. The TCU may be one of a plurality of ECUs included in the vehicle, the plurality of ECUs in the vehicle comprising a vehicular network.

The available power states 170 may be selected for the TCU, for various power states of the TCU during vehicle operation, from a discrete set of power states (e.g., as maintained in a master table). Selection of available power states from a discrete set of power states will be described further in relation to FIG. 4. The discrete set of power states may include all of the possible power states of the ECUs making up the vehicular network of the vehicle—and, in some embodiments, all of the possible power states of the vehicular networks of all vehicles in an associated fleet of vehicles. The discrete set of power states may be stored in a memory (e.g., a non-transitory memory) associated with one or more processors of the vehicle.

Information regarding the available power states may be received by the TCU (or another ECU of the vehicle) in the form of commands, e.g., from an operator or manager of the vehicle fleet, via a wireless communications link between the vehicle and the operator or manager of the vehicle fleet. Information regarding the available power states may be based on properties of the vehicle, such as a make of the vehicle, a model of the vehicle, and/or a usage model of the vehicle (e.g., as a taxi of a fleet of taxis, a vehicle for driving in a suburban environment, et cetera).

In some embodiments, a value in a command-type field may be selected from a range of values corresponding with possible commands, an example of which is presented in Table 1 below.

TABLE 1

Table of commands

| Enumeration number | Command field statement |
|---|---|
| 1 | add a power state |
| 2 | add a state machine transition |
| 3 | add a guard condition |
| 4 | add a trigger condition |
| 5 | add an action |
| 6 | modify existing guard condition |
| 7 | modify existing trigger condition |
| 8 | modify existing action |
| 9 | remove a state machine transition |
| 10 | remove a power state |
| 12 | remove a guard condition |
| 13 | remove a trigger condition |
| 14 | remove an action |

In various embodiments, the table of commands may be implemented in a non-transitory memory of one or more processors of the vehicle. The table of commands may be a pre-configured for one or more ECUs of a vehicular network. As shown above, the table of commands may enumerate a plurality of commands, with the enumeration number representing the value to include in the command-type field of a command in order to invoke the associated command. For example, in order to add a power state to an FSM of an ECU, the command-type field of a command may include the value 1, which is associated with the command to add a power state.

In some embodiments, the table of commands may be implemented in the hardware of one or more ECUs. In other embodiments, the table of commands may be stored in a memory (e.g., a non-transitory memory) of one or more processors of the vehicle. Addition, modification, and removal of power states, and addition, modification, and removal of trigger conditions, guard conditions, and actions of state machine transitions, according to the commands included in the table of commands, will be discussed more in relation to FIGS. 1B through 4.

Some of the commands received via the wireless communications link may include the command-type field having a value associated with adding an available power state, and another field having a value associated with the power state to be added. Such commands may include the command-type field and the power-state field as represented in a data structure substantially similar to the following:

<command type [=value for "add an available power state"]><power state>

The power-state field may have a value corresponding with a power state from the discrete set of power states, which may in turn be related to power management goals of the TCU as determined by the operator or manager of the vehicle fleet. In various embodiments, the command received via the wireless communications link may include an address field uniquely identifying the TCU or ECU within the vehicular network of the vehicle, in addition to the command-type field and the power-state field. In such embodiments, the command may include the address field, the command-type field, and the power-state field as represented in a data structure substantially similar to the following:

<address><command type><power state>

Correspondingly, each of the available power states of the TCU may populate a table of available power states, with the table being stored locally in a non-transitory memory of the TCU.

Returning to first embodiment 102, the available power states 170 for the TCU may include a stay in active power state 108, an active power state 110, a net off power state 120, a standby power state 130, a deep sleep power state 140, a backup battery (BUB) active power state 150, a BUB standby power state 160, and a TCU power off state 198. (Note that as shown in FIG. 1A, the deep sleep power state 140 is duplicated, for visual simplicity). A power saving mode 128, which may be utilized in order to minimize power usage of the TCU during vehicle operation, may comprise one or more of the active power state 110, the net off power state 120, the standby power state 130, the deep sleep power state 140, the BUB active power state 150, and the BUB standby power state 160, and the power states of the power saving mode 128. The power saving mode 128 may be configured from a core system of the car, e.g., via connection to a Klemme 30 (KL30) bus of a main battery of a vehicle.

During normal operation of the TCU (e.g., not in any power state included in the power saving mode 128), the TCU may be in the stay in active power state 108. The stay in active power state 108 may preclude states from the power saving mode 128, may include the TCU being always on and fully operational, and may be the default power state of operation of the TCU.

The power states included in the power saving mode 128—e.g., from a discrete set of power states in a master table—may be selected to be added to the table of available power states according to commands received via a wireless communications link with the operator or manager of the vehicle fleet (to be described in more detail in relation to FIG. 4). The active power state 110 may then be included within the power saving mode 128, which may be significantly similar to the stay in active power state 108 (and may include transitions between the active power state 110 and other states within the power saving mode 128, to be described later). Similarly, the standby power state 130 and the deep sleep power state 140 may be power saving states of the TCU, such that when the TCU is in either of the standby power state 130 or the deep sleep power state 140, several functions of the TCU may be powered off. In some embodiments, the standby power state 130 may include reducing and/or removing functionality for such modes as a Bluetooth low-energy radio, hotspot functionality if the TCU supports WiFi, and so on, of the TCU during the duration of application of the standby power state 130. In some embodiments, the deep sleep power state 140 may include suspending activity to random access memory (RAM) for several components of the TCU, and reducing and/or removing functionality for such modes an on state of a communication processor of the TCU, and an on state of an application processor of the TCU, during the duration of application of the deep sleep power state 140.

The net off power state 120 may be a reduced power state, whereby external communication functions of the TCU may be powered off. For example, in the net off power state 120, 4G/5G connectivity may be switched off. However, other functions of the TCU not pertaining to external communication may still be operational while the TCU remains in the net off power state 120; in this way, aside from the external communication functions which are switched off, the net off power state 120 may enable the same functionality of the TCU as the active power state 110.

The BUB active power state 150 may be utilized by the TCU in order to power the TCU via a backup power source (e.g., a backup battery of the vehicle), for example when the TCU is disconnected from a power supply of a vehicle (such as via disconnection from the KL30 bus of a main battery of the vehicle). The BUB active power state 150 may be one of two BUB power states, the other BUB power state being the BUB standby power state 160 (to be discussed further herein). In some embodiments, the BUB may be enabled in all power states; for example, for the BUB to be utilized in the deep sleep power state 140, a trigger condition that the vehicle is in a transport mode may be satisfied, otherwise the BUB may be disabled. The BUB active power state 150 may include the TCU being always on and fully operational, and in this way may be significantly similar to the stay in active power state 108 and the active power state 110. Additionally, in a manner similar to the stay in active power state 108, the TCU may stay in the BUB active power state 150 under the conditions that a wake-up timer has expired and no keep awake request exists.

As with the BUB active power state 150, the BUB standby power state 160 may be utilized by the TCU in order to power the TCU via a backup power source (e.g., a backup battery of the vehicle), for example when the TCU is disconnected from a power supply of a vehicle (such as via disconnection from the KL30 bus of a main battery of the vehicle). The BUB standby power state 160 may be significantly similar to the standby power state 130 in terms of functionality of the TCU, and in some embodiments, the BUB standby power state 160 may include reducing and/or removing functionality for such modes as the Bluetooth low-energy radio, hotspot functionality if the TCU supports WiFi, and so on, of the TCU during the duration of application of the BUB standby power state 160.

FIG. 1B illustrates a second embodiment 104 of the state machine 100 including the available power states 170, and further including a transition 154 defined between two power states therein. Each power state of the available power states 170 may be substantially similar to the corresponding power state shown in FIG. 1A, and the power saving mode 128 of FIG. 1B may be substantially similar to the power saving mode 128 of FIG. 1A.

In general, a transition between two power states of the TCU of the vehicle may include transitioning from an origin power state to a destination power state, may have one or more associated trigger conditions and/or one or more associated guard conditions to be satisfied in order for the transition to occur, and may include one or more actions to be taken concomitantly with the transition. In a manner similar to the way in which available power states may be selected from a discrete set of power states (e.g., in a master table), as discussed above in relation to FIG. 1A, the available guard conditions, available trigger conditions, and available actions may be selected from each of a discrete set of guard conditions, a discrete set of trigger conditions, and a discrete set of actions, respectively (e.g., as maintained in the master table). The discrete set of trigger conditions may include all of the possible trigger conditions of the ECUs making up the vehicular network of the vehicle—and, in some embodiments, all of the possible trigger conditions of the vehicular networks of all vehicles in an associated fleet of vehicles—with the discrete set of trigger conditions being stored in a non-transitory memory associated with one or more processors of the vehicle. The discrete set of guard conditions and the discrete set of trigger conditions may be similarly derived and/or stored.

In a manner similar to the discussion above regarding commands received via the wireless communications link for the addition of power states, some of the commands received via the wireless communications link may include a command-type field having a value associated with adding an available trigger condition, an available guard condition, or an available action. For example, a command received via wireless communications link may include a command-type field having a value associated with adding an available trigger condition (e.g., in accordance with a table of commands as discussed above), and another field having a value associated with the trigger condition to be added. Such commands may include the command-type field and the trigger-condition field as represented in a data structure substantially similar to the following:

<command type [=value for "add an available trigger condition"]><trigger condition>

The trigger-condition field may have a value corresponding with a trigger condition from the discrete set of trigger conditions, which may in turn be related to the power specifications of the TCU as determined by the operator or manager of the vehicle fleet. In various embodiments, the command received via the wireless communications link may include an address field uniquely identifying the TCU or ECU within the vehicular network of the vehicle, in addition to the command-type field and the trigger-condition field. In such embodiments, the command may include the address field, the command-type field, and the trigger-condition field as represented in a data structure substantially similar to the following:

<address><command type><trigger condition>

In various embodiments, commands for adding available guard conditions and commands for adding available actions may be similarly structured and/or interpreted. Correspondingly, each of the available trigger conditions, available guard conditions, and available actions of the TCU may populate tables of available trigger conditions, available guard conditions, and available actions, respectively, with each table being stored locally (e.g., in a non-transitory memory of the TCU).

In the embodiments depicted in FIGS. 1A through 2, the tables of available power states, available trigger conditions, available guard conditions, and available actions may include portions of the following tables (also referred to herein as Table 2, Table 3, Table 4, and Table 5, respectively):

TABLE 2

| Table of available power states | |
|---|---|
| Enumeration number | Power state |
| 1 | active (initial) |
| 2 | net off |
| 3 | standby |
| 4 | backup battery (BUB) active |
| 5 | BUB standby |
| 6 | power off (final) |

TABLE 3

| Table of available trigger conditions | |
|---|---|
| Enumeration number | Trigger condition |
| 1 | KL30 connected |
| 2 | ethernet wakeup |
| 3 | controller area network (CAN) line wakeup |
| 4 | KL30 disconnected |
| 5 | BUB power save mode set to BUB standby |
| 6 | power save mode set to standby |
| 7 | power save mode set to deep sleep |
| 8 | power save mode set to net off |
| 9 | standby mode timer expired |
| 10 | BUB power save mode set to deep sleep |

TABLE 4

| Table of available guard conditions | |
|---|---|
| Enumeration number | guard condition |
| 1 | wakeup timer expired? |
| 2 | keep awake request exist? |
| 3 | KL30 disconnected? |
| 4 | real-time clock (RTC) timer wakeup? |
| 5 | BUB standby mode? |

TABLE 5

| Table of available actions | |
|---|---|
| Enumeration number | Action |
| 1 | turn off application processor (AP) |
| 2 | put AP to suspend to random access memory (RAM) |
| 3 | turn on AP |
| 4 | turn off communication processor (CP) |
| 5 | put CP to dormant |
| 6 | turn CP to active |
| 7 | turn on audio codec |
| 8 | turn AP to send to receive (S2R) |
| 9 | turn CP to dormant |
| 10 | turn off audio codec |

The above embodiments of Table 2, Table 3, Table 4, and Table 5 shown may not be exhaustive, and in other embodiments, more entries to each of the above tables may be included. Each of the discrete sets of power states, trigger conditions, guard conditions, and actions may be configured according to the hardware specifications of each ECU. Moreover, each of the discrete sets of power states, trigger conditions, guard conditions, and actions may be implemented in a master table for a vehicular network.

In various embodiments, a master table for a vehicular network may be substantially similar to a master table of the vehicular networks of all vehicles in an associated fleet of vehicles. Accordingly, in various embodiments, the discrete sets of power states, trigger conditions, guard conditions, and actions in a master table may represent all of the possible power states, trigger conditions, guard conditions, and actions for a vehicular network, or for all vehicular networks of an associated fleet of vehicles. In various embodiments, the tables of available power states, trigger conditions, guard conditions, and actions may thus include subsets of the discrete sets of power states, trigger conditions, guard conditions, and actions (e.g., in the master table).

In this way, Table 2 through Table 5 may be assembled in response to one or more commands identified as being for the configuration of available power states, available trigger conditions, available guard conditions, and/or available actions. For commands identified as being for the configuration of available power states, an entry in a table of available power states corresponding with a value in another field of the command may be added. For commands identified as being for the configuration of available trigger conditions, an entry to a table of available trigger conditions corresponding with a value in another field of the command may be added. For commands identified as being for the configuration of available guard conditions, an entry to a table of available guard conditions corresponding with a value in another field of the command may be added. For commands identified as being for the configuration of available actions, an entry to a table of available actions corresponding with a value in another field of the command may be added.

After the available power states, available trigger conditions, available guard conditions, and available actions for the state machine 100 have been established, transitions between pairs of the available power states 170 may be added to the state machine 100, in response to one or more commands received at the TCU for the configuration of state machines. Some of the commands received via the wireless communications link may include a command-type field having a value associated with adding a state machine transition, and other fields related to one or more trigger conditions, guard conditions, and/or actions associated with the transition to be added. Such commands may include the command-type field, a field indicating an origin power state, a field indicating a number of trigger conditions, a field indicating the trigger conditions themselves, a field indicating a number of guard conditions, a field indicating the guard conditions themselves, a field indicating a number of actions, a field indicating the actions themselves, and/or a field indicating a destination power state. In such embodiments, the command may include the command-type field and the other fields as represented in a data structure substantially similar to the following:

```
<command type [= value for "add a state machine transition"]>
  <origin power state>
  <N1><trigger condition(s)>
  <N2><guard condition(s)>
  <N3><action(s)>
  <destination power state>.
```

As represented in the above data structure, the variable N1 may take an integer value from one to many, the variable N2 may take an integer value from zero to many, and the variable N3 may take an integer value from zero to many. The origin power state field of the command (e.g., the start state, or the starting power state for the transition being added) and the destination power state field of the command (e.g., the end state, or the ending power state for the transition being added) may be power states selected from the discrete set of power states of the TCU. The fields including the values N1, N2, and N3 may indicate, respectively, the number of trigger conditions, the number of guard conditions, and the number of actions associated with the transition to be added. In various embodiments, the command received via the wireless communications link may include an address field uniquely identifying the TCU or ECU within the vehicular network of the vehicle, in addition to the fields discussed above. In such embodiments, the command may include the address field, the command-type field, and the other fields as represented in a data structure substantially similar to the following:

```
<address><command type>
  <origin power state>
  <N1><trigger condition(s)>
  <N2><guard condition(s)>
  <N3><action(s)>
  <destination power state>.
```

In the above embodiments, values in the origin power state field and/or the destination power state field, the trigger-conditions field, the guard-conditions field, and/or the actions field may be chosen from Table 2, Table 3, Table 4, and Table 5, respectively. Some embodiments may implement guard conditions as trigger conditions, or and/or may implement trigger conditions as guard conditions.

Returning to the second embodiment 104 depicted in FIG. 1B, the transition 154 may be a transition from the BUB active power state 150 of the TCU to the BUB standby power state 160 of the TCU. The transition 154 may be performed if the associated trigger conditions and the associated guard conditions are satisfied. That is, if the trigger conditions and guard conditions associated with the transition 154 are satisfied, the TCU may switch from the BUB active power state 150 to the BUB standby power state 160. Additionally, concomitantly with performing the transition 154, one or more actions may be taken (as described below).

In the second embodiment 104, the trigger condition associated with the transition 154 from the BUB active power state 150 to the BUB standby power state 160 may be that the BUB power save mode is BUB standby, while a guard condition associated with the transition 154 may be that the BUB standby mode timer expired is false. The BUB power save mode and/or the BUB standby mode timer expired condition may have values that are stored in a memory of the TCU and/or are available to one or more processors of the TCU. In one example, the BUB standby timer associated with the field "BUB standby mode timer expired" may be 3 hours.

In some embodiments, the transition 154 as depicted in the second embodiment 104 may be configured in the state machine 100 from the following command:

$$<2><4><N1=1><5><N2=1><5><N3=3><8><9><10><5>$$

Where:

- the command type is "2" (e.g., a value in Table 1 for "add a state machine transition");
- the origin power state is 4 (e.g., a value in Table 2 for "BUB active"); the number of trigger conditions N1 is 1;
- the trigger condition is 5 (e.g., a value in Table 3 for "BUB power save mode set to BUB standby");
- the number of guard conditions N2 is 1;
- the guard condition is 5 (e.g., a value in Table 4 for "BUB standby mode");
- the number of actions N3 is 3;
- the actions are 8, 9, and 10 (e.g., values in Table 5 for "turn AP to S2R," "turn communication processor (CP) to dormant," and "turn off audio codec); and
- the destination power state is 5 (e.g., a value in Table 2 for "BUB standby")

If the trigger condition occurs, and if the guard condition is true, then the three actions are taken, and the power state may transition from the BUB active power state 150 (e.g., the origin power state) to the BUB standby power state 160 (e.g., the destination power state). In the above example, the enumeration numbers included in each field of the command associated with the transition 154 may be included as the enumeration numbers associated with the respective local tables (e.g., the tables of available power states, available trigger conditions, available guard conditions, and available actions). For some examples, the enumeration numbers included in each field of the command associated with the transition 154 may be included as enumeration numbers associated with the master table.

FIG. 1C illustrates a third embodiment 106 of the state machine 100 including the available power states 170, and further including a plurality of additional transitions, with each transition of the plurality of transitions being defined between pairs of the available power states 170. Each power state of the available power states 170 may be substantially similar to the corresponding power state shown in FIGS. 1A and 1B, the power saving mode 128 may be substantially similar to the power saving mode 128 of FIGS. 1A and 1B, and the transition 154 may be substantially similar to the transition 154 of FIG. 1B. Additionally, actions that may be associated with each transition of the plurality of transitions are not shown.

During normal operation of the TCU (e.g., not in any power state included in the power saving mode 128), the TCU may be in the stay in active power state 108. The state machine 100 may transition from the stay in active power state 108 to the active power state 110 if the trigger condition that the TCU is connected to KL30 is satisfied. Additionally, the TCU may remain in the stay in active power state 108 under the conditions that a wake-up timer has expired and no keep awake request exists. As described in relation to FIG. 1A, the stay in active power state 108 may preclude states from the power saving mode 128, may include the TCU being always on and fully operational, and may be the default power state of operation of the TCU.

In some embodiments, all initiations of the TCU being connected and/or disconnected from KL30 are for wakeup reasons. For example, a loss of a 12V power supply of the TCU via disconnection from KL30 may lead to a transition to an active power state (e.g., the BUB active power state 150), as well as re-connection of the TCU to a 12V power supply (e.g., the active power state 110). Further, as described in relation to FIG. 1A, the TCU may remain in the stay in active power state 108 under the conditions that a wake-up timer has expired and no keep awake request exists. Following a transition from the stay in active power state

108 to the active power state 110, the state machine may be in the power saving mode 128.

If the TCU continues to be connected to KL30, then from the active power state 110 in the power saving mode 128, the state machine 100 may transition to any of the standby power state 130, the net off power state 120, and the deep sleep power state 140. In order for the state machine 100 to transition from the active power state 110 to the standby power state 130 via a transition 114, both the trigger condition that the power save mode is standby and the guard condition that the standby mode timer expired is false may be satisfied. In some embodiments, the standby mode timer may be 2 to 3 weeks. In order for the state machine 100 to transition from the active power state 110 to the net off power state 120 via a transition 116, both the trigger condition that the power save mode is net off and the guard condition that the standby mode time expired is false may be satisfied. In order for the state machine 100 to transition from the active power state 110 to the deep sleep power state 140 via a transition 118, the trigger condition that the power save mode is deep sleep may be satisfied.

Conversely, if the TCU continues to be connected to KL30, the state machine 100 may transition from one of the standby power state 130, the net off power state 120, or the deep sleep power state 140 back to the active power state 110, provided trigger conditions and guard conditions are satisfied. For example, in order for the state machine 100 to transition from the standby power state 130 to the active power state 110 via a transition 132, a trigger condition of a general wakeup event may be satisfied. Similarly, in order for the state machine 100 to transition from the net off power state 120 to the active power state 110 via a transition 122, a trigger condition of a general wakeup event (except from a modem) may be satisfied. Further, in order for the state machine 100 to transition from the deep sleep power state 140 to the active power state 110 via a transition 194, one or more of the trigger conditions of a controller area network (CAN) wakeup, a real-time clock (RTC) timer wakeup, or a KL30 connected/disconnected occurrence may be satisfied. In particular, if the TCU is in the deep sleep power state 140 and the TCU becomes disconnected from KL30, the TCU may transition from the deep sleep power state 140 to the active power state 110 via transition 194, and then may subsequently transition from the active power state 110 to the BUB active state 150 via transition 112, as a direct transition from the deep sleep power state 140 to the BUB active state 150 might not be allowed.

If the TCU is disconnected from KL30, the state machine 100 may transition to one or more BUB power states. For example, in order for the state machine 100 to transition from the active power state 110 to the BUB active power state 150 via a transition 112, a trigger condition of the TCU being disconnected from KL30 may be satisfied. Conversely, the state machine 100 may transition from the BUB active power state 150 to the active power state 110 via a transition 156 when the trigger condition of the TCU being connected to KL30 is satisfied.

As described in relation to FIG. 1B, the state machine 100 may transition from the BUB active power state 150 to the BUB standby power state 160 via a transition 154 following the trigger condition of the BUB power save mode being BUB standby, in addition to the guard condition of the BUB standby mode timer expired being false. Conversely, the state machine 100 may transition from the BUB standby power state 160 to the BUB active power state 150 via a transition 162 when one or more of the trigger conditions of modem wakeup, e.g., emergency call (eCall) callback, the RTC timer waking up, and the TCU being connected to the KL30 only are satisfied. In some examples, the modem wakeup trigger condition of transition 162 may be associated with an eCall callback from the public-safety answering point (PSAP), wherein the KL30 is disconnected for the TCU, and hence the TCU may have to rely on the BUB active power state 150 to ensure that the audio path is established, and GPS location details are sent. In some further examples, the RTC timer wake-up of transition 162 may initiate a keep-alive communication with an OEM backend via a data connection. Additionally, in some further examples, the TCU being connected to the KL30 only condition of transition 162 may be initiated via an ignition being switched on by a vehicle operator. If at least one request for the BUB standby is made, the state machine 100 may transition to the BUB standby power state 160, or may otherwise transition to the deep sleep power state 140. The BUB active power state 150 may transition to the deep sleep power state 140 via a transition 152 following the trigger condition of the BUB power save mode being deep sleep and the guard condition that BUB standby timer expired condition is true.

From the deep sleep power state 140, the state machine 100 may transition to the TCU power off state 198 following the trigger condition that the TCU is disconnected from KL30 or that KL30 is drained when the BUB is disabled, or following the guard condition that the TCU is disconnected from KL30 or that KL30 is drained and the BUB is drained when the BUB is enabled.

The TCU power off state 198 may be a fully off state for the TCU, such that no functions of the TCU may be operational. In the TCU power off state 198, the RTC timer setting may be lost, and reconnection of the TCU to KL30 might merely be possible via a wake-up.

FIG. 2 illustrates an embodiment 206 of a state machine 200 including a plurality of available power states 270 of a TCU of a vehicle, and further including a plurality of transitions, with each transition of the plurality of transitions defined between pairs of power states of the available power states 270. It will be appreciated that components of the embodiment 206 of the state machine 200 may be substantially similar to or identical to components of the third embodiment 106 of the state machine 100 of FIG. 1C, and may be labeled with corresponding numbers, prefixed with a “2” instead of a “1”. For example, a BUB active power state 250 may be substantially similar to or identical to the BUB active power state 150 of FIG. 1C. The embodiment 206 of the state machine 200 may also contain other components not included in the third embodiment 106 of the state machine 100 of FIG. 1C, as described further herein.

In some circumstances, the operator or manager of the vehicle fleet may determine, e.g., from data analytics performed based upon one or more of a make of the vehicle, a model of the vehicle, and a usage-model of the vehicle (such as whether the vehicle is used as part of a taxi fleet, for city use, et cetera), that it may be desirable to supplement the available power states as included in the table of available power states for that vehicle.

For example, in some embodiments, it may be determined (e.g., via data analytics conducted by the operator or manager of the vehicle fleet) that an intermediate state between a standby power state 230 and an active power state 210, such as a low power active power state 280, may be useful in order to validate the wakeup to decide whether to transition to the active power state 210 or return to the standby power state 230. In such embodiments, it may be desirable that the TCU be in a higher power state to determine if the wakeup condition was valid or not. Therefore, in such embodiments, in response to a trigger condition of any type of wakeup from the standby power state 230 being satisfied, the state machine 200 may transition from the standby power state 230 to the low power active power state 280 via a transition 234. Once in the low power active power state 280, the state machine may determine if the trigger condition of an invalid wakeup is satisfied, and may then return to the standby power state 230 via a transition 282. However, if the wakeup was valid, then the state machine 200 may transition from the low power active power state 280 to the active power state 210 via a transition 232.

In this way, FIGS. 1A through 2 illustrate various embodiments of state machines of a TCU of a vehicle, including a plurality of power states and transitions therebetween. The state machines are non-limiting embodiments, however, and different state machines for ECUs are possible.

In general, the state machines as illustrated in relation to FIGS. 1B through 2 may be implemented within a larger system for the configuration of power management state machines for a remote vehicle, the system comprising a wireless communications link with a vehicle, one or more processors, and a non-transitory memory having executable instructions that, when executed, may cause the one or more processors to: prepare one or more first commands in a language for establishing parts of power management state machines of vehicles, the one or more first commands including command-type fields that have predetermined values from a table of commands that correspond with one or more of: the configuration of available states, the configuration of available trigger conditions, the configuration of available guard conditions, and the configuration of available actions. The system may further prepare one or more second commands in the language for establishing parts of power management state machines of vehicles, the one or more second commands including command-type fields that have a predetermined value from the table of commands that corresponds with the configuration of state machine transitions, wherein the first commands and the second commands are for transmission to the vehicle across the wireless communications link, and wherein the one or more first commands and the one or more second commands are based upon at least one of: a make of the vehicle, a model of the vehicle, and a usage-model of the vehicle. In the description of some of the embodiments of state machines as depicted in FIGS. 1A through 2, the one or more processors may include one or more ECUs of a vehicular network of the remote vehicle, including a TCU, and commands of the one or more first commands and the one or more second commands may contain unique addresses, the unique addresses identifying ECUs of the one or more ECUs of the remote vehicle.

Upon receiving the one or more first commands at the remote vehicle, values of available states, available trigger conditions, available guard conditions, and available actions of the one or more first commands may be added to each of a table of available states, a table of available trigger conditions, a table of available guard conditions, and a table of available actions, respectively, where each of the table of available states, the table of available trigger conditions, the table of available guard conditions, and the table of available actions may be configured for and stored in the memory of the specific ECU. Further, upon receiving one or more second commands at the remote vehicle, the one or more second commands may be identified as being for the configuration of state machine transitions via detecting that the value of the command-type field of the command matching a predetermined value from the table of commands that corresponds with the configuration of state machine transitions. By utilizing the command-based framework described in relation to FIGS. 1A through 2 for the configuration of a state machine of a vehicle, power states of the TCU may be easily adapted in real time in response to commands received from the operator or manager of the vehicle fleet in order to minimize power usage by the TCU.

FIG. 3 illustrates a method 300 for a command-based framework for populating each of a table of available power states, a table of available trigger conditions, a table of available guard conditions, and/or a table of available actions for an FSM (such as the state machine 100 of FIGS. 1A through 1C, or the state machine 200 of FIG. 2). The tables may be stored in a memory (e.g., a non-transitory memory) of an ECU of a vehicle (such as the TCU described in relation to FIGS. 1A through 2). The available power states, trigger conditions, guard conditions, and actions may be taken from a discrete set of power states, a discrete set of trigger conditions, a discrete set of guard conditions, and a discrete set of actions, respectively, with the discrete sets of power states, trigger conditions, guard conditions, and actions comprising a master table.

The method 300 may be iterated over each time a command is received at a vehicle for the population of a table of available power states, trigger conditions, guard conditions, or actions for an FSM of an ECU of the vehicle. In various embodiments, an ECU may be perpetually open to receiving commands for the initialization of the tables for available power states, trigger conditions, guard conditions, and actions for the FSM via the wireless communications link. However, in other embodiments, an ECU may first specify being in a mode to receive commands for the initialization of the aforementioned tables, and may then initialize the tables based on received commands. In some embodiments, the method 300 may be employed at the level of a vehicular network, and may encompass some or all ECUs of a vehicle. For some embodiments, the method 300 may be employed at the level of a single ECU.

At a part 305, the method 300 may include determining if a command is received at one or more of the ECUs of the vehicle. In one example, a command may be received at one or more ECUs of the vehicle over a wireless communications link, for example via networks such as GSM, GPRS, Wi-Fi, WiMax, LTE, or 5G. For such commands received via a wireless link, in some embodiments, the command may include a field for an address uniquely identifying an ECU among a vehicular network of ECUs of the vehicle, as described in relation to FIGS. 1A through 2. In some embodiments, a command may be received at one or more ECUs of the vehicle via a coupling to one or more other components (e.g., other ECUs) of the vehicle, such as a communicative coupling through the vehicular network. If no command is received at the one or more ECUs of the vehicle, the method 300 may proceed to a part 310 to maintain current operations of the ECUs, and may then return to the part 305. If a command is received at any of the one or more ECUs of the vehicle, the method 300 may proceed to a part 315.

At the part 315, the method 300 may determine if the command received includes a command-type field for adding power states to the table of available power states. If it is determined that the command received includes a command-type field for adding power states to the table of available power states, the method 300 may proceed to a part 320, and may populate the table of available power states from the master table with the power state indicated in the received command, after which the method 300 may proceed to a part 325. If it is determined that the command received does not include a command-type field for adding power states to the table of available power states, the method 300 may proceed directly to the part 325.

At the part 325, the method 300 may determine if the command received includes a command-type field for adding trigger conditions to the table of available trigger conditions. If it is determined that the command received includes a command-type field for adding trigger conditions to the table of available trigger conditions, the method 300 may proceed to a part 330, and may populate the table of available trigger conditions from the master table with the trigger condition indicated in the received command, after which the method 300 may proceed to a part 335. If it is determined that the command received does not include a command-type field for adding trigger conditions to the table of available trigger conditions, the method 300 may proceed directly to the part 335.

At the part 335, the method 300 may determine if the command received includes a command-type field for adding guard conditions to the table of available guard conditions. If it is determined that the command received includes a command-type field for adding guard conditions to the table of available guard conditions, the method 300 may proceed to a part 340, and may populate the table of available guard conditions from the master table with the guard condition indicated in the received command, after which the method 300 may proceed to a part 345. If it is determined that the command received does not include a command-type field for adding guard conditions to the table of available guard conditions, the method 300 may proceed directly to the part 345.

At the part 345, the method 300 may determine if the command received includes a command-type field for adding actions to the table of available actions. If it is determined that the command received includes a command-type field for adding actions to the table of available actions, the method 300 may proceed to a part 350, and may populate the table of available actions from the master table with the action indicated in the received command, after which the method 300 may proceed to a part 360. If it is determined that the command received does not include a command-type field for adding actions to the table of available actions, the method 300 may proceed directly to the part 360.

At the part 360, the method 300 may continue operation of the ECUs, and may return to its starting point.

FIG. 4 illustrates a method 400 for a command-based framework for configuring transitions of an FSM based on a table of available power states, a table of available trigger conditions, a table of available guard conditions, and/or a table of available actions (such as the state machine 100 of FIGS. 1A through 1C, or the state machine 200 of FIG. 2). The FSM may be for an ECU of a vehicle (such as TCU as described in relation to FIGS. 1A through 2). Configuration of a transition between two power states of the FSM for the ECU may be accomplished through commands indicating an origin power state, one or more trigger conditions, zero or more guard conditions, zero or more actions, and/or a destination power state.

The method 400 may be iterated over each time a command is received at a vehicle for the configuration of a transition between available power states of an FSM of an ECU of the vehicle. In various embodiments, an ECU may be perpetually open to receiving commands for the configuration of transitions of the FSM via a wireless communications link. However, in other embodiments, an ECU may first specify being in a mode to receive commands for the configuration of the aforementioned transitions, and may then configure a transition of the FSM of the ECU based on received commands. In some embodiments, the method 400 may be employed at the level of a vehicular network, and may encompass some or all ECUs of a vehicle. For some embodiments, the method 400 may be employed at the level of a single ECU.

At a part 405, the method 400 may include determining if a command is received at one or more ECUs of the vehicle. In various embodiments, a command may be received at one or more ECUs of the vehicle over a wireless communications link, for example via networks such as GSM, GPRS, Wi-Fi, WiMax, LTE or 5G. For such commands received via a wireless link, in some embodiments, the command may include a field for an address uniquely identifying an ECU among a vehicular network of ECUs of the vehicle, as described in relation to FIGS. 1A through 2. In some embodiments, a command may be received at one or more ECUs of the vehicle via an electrical coupling to one or more other components (e.g., other ECUs) of the vehicle. If no command is received at the one or more ECUs of the vehicle, the method 400 may proceed to a part 410 to maintain current operation of the ECUs, and may then return to the part 405. If a command is received at any of the one or more ECUs of the vehicle, the method 400 may proceed to a part 415.

At the part 415, the method 400 may determine if the command received is for configuration of transitions for FSMs. The command may be determined to be for the configuration of transitions for FSMs if the command includes a command-type field, and a value of the command-type field is associated with adding a transition between power states, as described in relation to FIGS. 1B through 2. If it is determined that the command received is not for configuration of transitions for FSMs, the method 400 may proceed to a part 420 to continue operation of the ECUs, and the method 400 may then return to its starting point. If it is determined that if the command received is for configuration of transitions for FSMs, the method 400 may then proceed to a part 430

At the part 430, the method 400 may select an origin power state for a transition for an FSM from the table of available power states of the ECU, according to the received command. Selecting an origin power state for the FSM transition may include selecting a power state from a table of available power states according to a value of an origin power state field of the received command, as described in relation to FIGS. 1B through 2. Following selection of an origin power state, the method 400 may proceed to a part 440.

At the part 440, the method 400 may select one or more trigger conditions for the transition for the FSM from the table of available trigger conditions of the ECU, according to the received command. Selecting one or more trigger conditions for the FSM transition may include determining a number N1 of trigger conditions according to a value of a number-of-trigger-conditions field of the received command, then selecting N1 trigger conditions from a table of available trigger conditions according to one or more values of a trigger-conditions field of the received command, as described in relation to FIGS. 1B through 2. In some instances, there may be a single trigger condition, while in other instances, there may be more than one trigger condition. Following selection of one or more trigger conditions, the method 400 may proceed to a part 450.

At the part 450, the method 400 may select zero or more guard conditions for the transition for the FSM from the table of available guard conditions of the ECU, according to the received command. Selecting zero or more guard conditions for the FSM transition may include determining a number N2 of guard conditions according to a value of a number-of-guard-conditions field of the received command, then selecting N2 guard conditions from a table of available guard conditions according to one or more values of a guard-conditions field of the received command, as described in relation to FIGS. 1B through 2. In some instances, there may be a single guard condition, while in other instances, there may be more than one guard conditions. In yet other instances, there may be no guard conditions, as guard conditions may be optional. Following selection of one or more guard conditions, the method 400 may proceed to a part 460.

At the part 460, the method 400 may select zero or more actions for the transition for the FSM from the table of available actions of the ECU, according to the received command. Selecting zero or more actions for the FSM transition may include determining a number N3 of actions according to a value of a number-of-actions field of the received command, then selecting N3 actions from a tables of available actions according to one or more values of an actions field of the received command, as described in relation to FIGS. 1B through 2. In some instances, there may be a single action, while in other instances, there may be more than one action. In yet other instances, there may be no actions, as actions may be optional. Following selection of one or more actions, the method 400 may proceed to a part 470.

At the part 470, the method 400 may select a destination power state for the transition for the FSM from the table of available power states of the ECU, according to the received command. Selecting the destination power state for the FSM transition may include selecting a power state from a table of available power states according to a value of a destination power state field of the received command, as described in relation to FIGS. 1B through 2. Following selection of each of the origin power state, the one or more trigger conditions, the zero or more guard conditions, the zero or more actions, and the destination power state, the method 400 may proceed to a part 480.

At the part 480, method 400 may configure the transition for the FSM, from the origin power state to the destination power state, with the selected trigger conditions, guard conditions, and actions (e.g., as part of assembling and/or configuring the FSM). Configuring the transition for the FSM may include configuring the ECU according to the received command, such that if one or more of the trigger conditions are satisfied, and if the zero or more guard conditions are true (if applicable), the zero or more actions will be taken (if applicable), and the ECU may then transition from the origin power state to the destination power state. For example, for the transition 154 of FIG. 1B between two power states of the available power states 170, the transition is from an origin power state, the BUB active power state 150, to a destination power state, the BUB standby power state 160. Once configured, the transition from the origin power state to the destination power state may include monitoring for the trigger condition of the transition (that the BUB power save mode is BUB standby), such that if the guard condition of the transition (that the BUB standby mode expired is false), then each of the actions of the transition (turn AP to S2R, turn CP to dormant, and turn off audio codec are) are taken, and the TCU may transition from the BUB active power state 150 to the BUB standby power state 160. Following the part 480, the method 400 may return to its starting point.

FIG. 5 illustrates a partial view of a cabin 500 of a vehicle 502 in which a driver and/or one or more passengers may be seated. The vehicle 502 of FIG. 5 may be a motor vehicle including drive wheels (not shown) and an internal combustion engine 504. The internal combustion engine 504 may include one or more combustion chambers which may receive intake air via an intake passage and exhaust combustion gases via an exhaust passage. The vehicle 502 may be a road automobile or another type of vehicle. In some examples, the vehicle 502 may include a hybrid propulsion system including an energy conversion device operable to absorb energy from vehicle motion and/or the engine and convert the absorbed energy to an energy form suitable for storage by an energy storage device. The vehicle 502 may include a fully electric vehicle, incorporating fuel cells, solar energy capturing elements, and/or other energy storage systems for powering the vehicle.

As shown, an instrument panel 506 may include various displays and controls accessible to a human driver (also referred to as the user) of the vehicle 502. For example, the instrument panel 506 may include a touch screen 508 of an in-vehicle computing system 509 (e.g., an infotainment system), an audio system control panel, and an instrument cluster 510. The touch screen 508 may receive user input to the in-vehicle computing system 509 for controlling audio output, visual display output, user preferences, control parameter selection, et cetera. While the example system shown in FIG. 5 includes audio system controls that may be performed via a user interface of the in-vehicle computing system 509, such as the touch screen 508, without a separate audio system control panel, in other embodiments, the vehicle may include an audio system control panel, which may include controls for a conventional vehicle audio system such as a radio, compact disc player, MP3 player, et cetera. The audio system controls may include features for controlling one or more aspects of audio output via speakers 512 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, the in-vehicle computing system 509 may adjust a radio station selection, a playlist selection, a source of audio input (e.g., from radio or CD or MP3), et cetera, based on user input received directly via the touch screen 508, or based on data regarding the user (such as a physical state and/or environment of the user) received via one or more external devices 550 and/or a mobile device 528. The audio system of the vehicle may include an amplifier (not shown) coupled to plurality of loudspeakers (not shown). In some embodiments, one or more hardware elements of the in-vehicle computing system 509, such as the touch screen 508, a display screen 511, various control dials, knobs and buttons, memory, processor(s), and any interface elements (e.g., connectors or ports) may form an integrated head unit that is installed in the instrument panel 506 of the vehicle. The head unit may be fixedly or removably attached in the instrument panel 506. In additional or alternative embodiments, one or more hardware elements of the in-vehicle computing system 509 may be modular and may be installed in multiple locations of the vehicle.

The vehicle may include one or more sensors for monitoring the vehicle, the user, and/or the environment. For example, sensors may be positioned in a powertrain compartment, on an external surface of the vehicle, and/or in other suitable locations for providing information regarding the operation of the vehicle, ambient conditions of the vehicle, a user of the vehicle, et cetera. Information regarding ambient conditions of the vehicle, vehicle status, or vehicle driver may also be received from sensors external to/separate from the vehicle (that is, not part of the vehicle system), such as sensors coupled to the external devices 550 and/or the mobile device 528.

The vehicle may include one or more cameras for monitoring the vehicle surroundings, traffic information, and/or the environment. For example, cameras may be positioned on the front, the sides, the rear, the top, and/or any other position on the vehicle. Image information captured by the one or more cameras may be displayed on the device displays described herein. For example, when the vehicle is in reverse, a video feed from one or more rear cameras may be displayed on a device display.

The cabin 500 may also include one or more user objects, such as the mobile device 528, that are stored in the vehicle before, during, and/or after travelling. The mobile device 528 may include a smart phone, a tablet, a laptop computer, a portable media player, and/or any suitable mobile computing device. The mobile device 528 may be connected to the in-vehicle computing system via a communication link 530. The communication link 530 may be wired (e.g., via Universal Serial Bus (USB), Mobile High-Definition Link (MHL), High-Definition Multimedia Interface (HDMI), Ethernet, et cetera) or wireless (e.g., via Bluetooth, Wi-Fi, Wi-Fi direct, Near-Field Communication (NFC), cellular connectivity, et cetera) and configured to provide two-way communication between the mobile device and the in-vehicle computing system. The mobile device 528 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 530 may provide sensor and/or control signals from various vehicle systems (such as vehicle audio system, climate control system, et cetera) and the touch screen 508 to the mobile device 528 and may provide control and/or display signals from the mobile device 528 to the in-vehicle systems and the touch screen 508. The communication link 530 may also provide power to the mobile device 528 from an in-vehicle power source in order to charge an internal battery of the mobile device.

The in-vehicle computing system 509 may also be communicatively coupled to additional devices operated and/or accessed by the user but located external to the vehicle 502, such as the external devices 550. In the depicted embodiment, external devices are located outside of the vehicle 502 though it will be appreciated that in alternate embodiments, external devices may be located inside the cabin 500. The external devices may include a server computing system, personal computing system, portable electronic device, electronic wrist band, electronic head band, portable music player, electronic activity tracking device, pedometer, smartwatch, GPS system, et cetera. The external devices 550 may be connected to the in-vehicle computing system via a communication link 536 which may be wired or wireless, as discussed with reference to the communication link 530, and configured to provide two-way communication between the external devices and the in-vehicle computing system. For example, the external devices 550 may include one or more sensors and the communication link 536 may transmit sensor output from the external devices 550 to the in-vehicle computing system 509 and the touch screen 508. The external devices 550 may also store and/or receive information regarding contextual data, user behavior/preferences, operating rules, et cetera and may transmit such information from the external devices 550 to the in-vehicle computing system 509 and the touch screen 508. As described herein, the communication link may be limited in some locations, referred to as black spots.

The in-vehicle computing system 509 may analyze the input received from the external devices 550, the mobile device 528, and/or other input sources and select settings for various in-vehicle systems (such as the audio system), provide output via the touch screen 508 and/or the speakers 512, communicate with the mobile device 528 and/or the external devices 550, and/or take other actions based on the assessment. In some embodiments, all or a portion of the assessment may be performed by the mobile device 528 and/or the external devices 550.

In some embodiments, one or more of the external devices 550 may be communicatively coupled to the in-vehicle computing system 509 indirectly, via the mobile device 528 and/or another of the external devices 550. For example, the communication link 536 may communicatively couple the external devices 550 to the mobile device 528 such that output from the external devices 550 is relayed to the mobile device 528. Data received from the external devices 550 may then be aggregated at the mobile device 528 with data collected by the mobile device 528, the aggregated data then transmitted to the in-vehicle computing system 509 and the touch screen 508 via the communication link 530. Similar data aggregation may occur at a server system and then transmitted to the in-vehicle computing system 509 and the touch screen 508 via the communication link 536 and/or the communication link 530.

FIG. 6 shows a block diagram of the in-vehicle computing system 509 configured and/or integrated inside the vehicle 502. The in-vehicle computing system 509 may perform one or more of the methods described herein. In some examples, the in-vehicle computing system 509 may include a vehicle infotainment system configured to provide information-based media content (audio and/or visual media content, including entertainment content, navigational services, et cetera) to a vehicle user to enhance the operator's in-vehicle experience. The vehicle infotainment system may include, or be coupled to, various vehicle systems, sub-systems, hardware components, as well as software applications and systems that are integrated in, or integratable into, the vehicle 502 in order to enhance an in-vehicle experience for a driver and/or a passenger.

The in-vehicle computing system 509 may include one or more processors including an operating system processor 614 and an interface processor 620. The operating system processor 614 may execute an operating system on the in-vehicle computing system, and control input/output, display, playback, and other operations of the in-vehicle computing system. The interface processor 620 may interface with the vehicle control system 630 via an inter-vehicle system communication module 622.

In some embodiments, one or more processors of the operating system processor 614 and/or the interface processor 620 may optionally include individual components that are distributed throughout two or more devices, which may be remotely located and/or configured for coordinated processing. In some embodiments, one or more aspects of the one or more processors may be virtualized and executed by remotely-accessible networked computing devices in a cloud computing configuration. In some embodiments, the one or more processors may include other electronic components capable of carrying out processing functions, such as a digital signal processor, an FPGA, or a graphic board. In some embodiments, the one or more processors may include multiple electronic components capable of carrying out processing functions. For example, the one or more processors may include two or more electronic components selected from a plurality of possible electronic components, including a central processor, a digital signal processor, a field-programmable gate array, and a graphics board. In still further embodiments, the one or more processors may be configured as a graphical processing unit (GPU), including parallel computing architecture and parallel processing capabilities.

The inter-vehicle system communication module 622 may output data to other vehicle systems 631 and vehicle control elements 661, while also receiving data input from the other vehicle systems 631 and vehicle control elements 661, e.g., by way of the vehicle control system 630. When outputting data, the inter-vehicle system communication module 622 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as GPS sensors, et cetera), digital signals propagated through vehicle data networks (such as an engine CAN bus through which engine related information may be communicated, a climate control CAN bus through which climate control related information may be communicated, and a multimedia data network through which multimedia data is communicated between multimedia components in the vehicle). For example, the in-vehicle computing system 509 may retrieve from the engine CAN bus the current speed of the vehicle estimated by the wheel sensors, a power state of the vehicle via a battery and/or power distribution system of the vehicle, an ignition state of the vehicle, et cetera. In addition, other interfacing means such as Ethernet may be used as well without departing from the scope of this disclosure.

A non-volatile storage device 608 may be included in the in-vehicle computing system 509 to store data such as instructions executable by the operating system processors 614 and the interface processor 620 in non-volatile form. The non-volatile storage device 608 may store application data, including prerecorded sounds, to enable the in-vehicle computing system 509 to run an application for connecting to a cloud-based server and/or collecting information for transmission to the cloud-based server. In particular, the non-volatile storage device 608 may store a master table of a vehicular network of ECUs of the vehicle. The application may retrieve information gathered by vehicle systems/sensors, input devices (e.g., a user interface 618), data stored in a volatile storage device 619A or a non-volatile storage device 619B (e.g., memory), devices in communication with the in-vehicle computing system (e.g., a mobile device connected via a Bluetooth link), et cetera. The in-vehicle computing system 509 may further include the volatile storage device 619A. The volatile storage device 619A may be RAM. Non-transitory storage devices, such as the non-volatile storage device 608 and/or the non-volatile storage device 619B, may store instructions and/or code that, when executed by a processor (e.g., the operating system processor 614 and/or the interface processor 620), controls the in-vehicle computing system 509 to take one or more of the actions described in the disclosure.

A microphone 602 may be included in the in-vehicle computing system 509 to receive voice commands from a user, to measure ambient noise in the vehicle, to determine whether audio from speakers of the vehicle is tuned in accordance with an acoustic environment of the vehicle, et cetera. A speech processing unit 604 may process voice commands, such as the voice commands received from the microphone 602. In some embodiments, the in-vehicle computing system 509 may also be able to receive voice commands and sample ambient vehicle noise using a microphone included in a vehicle audio system 632.

One or more additional sensors may be included in a sensor subsystem 610 of the in-vehicle computing system 509. For example, the sensor subsystem 610 may include a camera, such as a rear view camera for assisting a user in parking the vehicle and/or a cabin camera for identifying a user (e.g., using facial recognition and/or user gestures). The sensor subsystem 610 of the in-vehicle computing system 509 may communicate with and receive inputs from various vehicle sensors and may further receive user inputs. For example, the inputs received by the sensor subsystem 610 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, et cetera), an audio sensor detecting voice commands issued by a user, a fob sensor receiving commands from and optionally tracking the geographic location/proximity of a fob of the vehicle, et cetera. While certain vehicle system sensors may communicate with the sensor subsystem 610 alone, other sensors may communicate with both the sensor subsystem 610 and the vehicle control system 630, or may communicate with the sensor subsystem 610 indirectly via the vehicle control system 630. A navigation subsystem 611 of the in-vehicle computing system 509 may generate and/or receive navigation information such as location information (e.g., via a GPS sensor and/or other sensors from the sensor subsystem 610), route guidance, traffic information, point-of-interest (POI) identification, and/or provide other navigational services for the driver.

An external device interface 612 of the in-vehicle computing system 509 may be coupleable to and/or communicate with the external devices 550 located external to the vehicle 502. While the external devices are illustrated as being located external to the vehicle 502, it is to be understood that they may be temporarily housed in the vehicle 502, such as when the user is operating the external devices while operating the vehicle 502. In other words, the external devices 550 are not integral to the vehicle 502. The external devices 550 may include the mobile device 528 (e.g., connected via a Bluetooth, NFC, Wi-Fi direct, 4G LTE, 5G connection, or other wireless connection) or an alternate Bluetooth-enabled device 652. The mobile device 528 may be a mobile phone, smart phone, wearable devices/sensors that may communicate with the in-vehicle computing system via wired and/or wireless communication, or other portable electronic device(s). Other external devices include external services 646. For example, the external devices may include extra-vehicular devices that are separate from and located externally to the vehicle. Still other external devices include external storage devices 654, such as solid-state drives, pen drives, USB drives, et cetera. The external devices 550 may communicate with the in-vehicle computing system 509 either wirelessly or via connectors without departing from the scope of this disclosure. For example, the external devices 550 may communicate with the in-vehicle computing system 509 through the external device interface 612 over a network 660, a USB connection, a direct wired connection, a direct wireless connection, and/or other communication link.

The external device interface 612 may provide a communication interface to enable the in-vehicle computing system to communicate with mobile devices associated with contacts of the driver. For example, the external device interface 612 may enable phone calls to be established and/or text messages (e.g., SMS, MMS, et cetera) to be sent (e.g., via a cellular communications network) to a mobile device associated with a contact of the driver. The external device interface 612 may additionally or alternatively provide a wireless communication interface to enable the in-vehicle computing system to synchronize data with one or more devices in the vehicle (e.g., the driver's mobile device) via Wi-Fi direct, as described in more detail below.

One or more mobile device applications 644 may be operable on the mobile device 528. As an example, a mobile device application 644 may be operated to aggregate user data regarding interactions of the user with the mobile device. For example, a mobile device application 644 may aggregate data regarding music playlists listened to by the user on the mobile device, telephone call logs (including a frequency and duration of telephone calls accepted by the user), positional information including locations frequented by the user and an amount of time spent at each location, et cetera. The collected data may be transferred by the mobile device application 644 to the external device interface 612 over the network 660. In addition, specific user data requests may be received at the mobile device 528 from the in-vehicle computing system 509 via the external device interface 612. The specific data requests may include requests for determining where the user is geographically located, an ambient noise level and/or music genre at the user's location, an ambient weather condition (temperature, humidity, et cetera) at the user's location, et cetera. The mobile device application 644 may send control instructions to components (e.g., microphone, amplifier et cetera) or other applications (e.g., navigational applications) of the mobile device 528 to enable the requested data to be collected on the mobile device or requested adjustment made to the components. The mobile device application 644 may then relay the collected information back to the in-vehicle computing system 509.

Likewise, one or more external services applications 648 may be operable on the external services 646. As an example, external services applications 648 may be operated to aggregate and/or analyze data from multiple data sources. For example, external services applications 648 may aggregate data from one or more social media accounts of the user, data from the in-vehicle computing system (e.g., sensor data, log files, user input, et cetera), data from an internet query (e.g., weather data, POI data), et cetera. The collected data may be transmitted to another device and/or analyzed by the application to determine a context of the driver, vehicle, and environment and take an action based on the context (e.g., requesting/sending data to other devices).

The vehicle control system 630 may include controls for controlling aspects of various vehicle systems 631 involved in different in-vehicle functions. These may include, for example, controlling aspects of the vehicle audio system 632 for providing audio entertainment to the vehicle occupants, aspects of a climate control system 634 for meeting the cabin cooling or heating specifications of the vehicle occupants, as well as aspects of a telecommunication system 636 for enabling vehicle occupants to establish telecommunication linkage with others.

The vehicle audio system 632 may include one or more acoustic reproduction devices including electromagnetic transducers such as one or more speakers 635. The vehicle audio system 632 may be passive or active such as by including a power amplifier. In some examples, the in-vehicle computing system 509 may be the sole audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

The climate control system 634 may be configured to provide a comfortable environment within the cabin or passenger compartment of the vehicle 502. The climate control system 634 includes components enabling controlled ventilation such as air vents, a heater, an air conditioner, an integrated heater and air-conditioner system, et cetera. Other components linked to the heating and air-conditioning setup may include a windshield defrosting and defogging system capable of clearing the windshield and a ventilation-air filter for cleaning outside air that enters the passenger compartment through a fresh-air inlet.

The vehicle control system 630 may also include controls for adjusting the settings of various vehicle control elements 661 (or vehicle system control elements) related to the engine and/or auxiliary elements within a cabin of the vehicle, such as steering wheel controls 662 (e.g., steering wheel-mounted audio system controls, cruise controls, windshield wiper controls, headlight controls, turn signal controls, et cetera), instrument panel controls, microphone (s), accelerator/brake/clutch pedals, a gear shift, door/window controls positioned in a driver or passenger door, seat controls, cabin light controls, audio system controls, cabin temperature controls, et cetera. Vehicle control elements 661 may also include internal engine and vehicle operation controls (e.g., engine controller module, actuators, valves, et cetera) that are configured to receive instructions via the CAN bus of the vehicle to change operation of one or more of the engine, exhaust system, transmission, and/or other vehicle system. The control signals may also control audio output at the speakers 635 of the vehicle audio system 632. For example, the control signals may adjust audio output characteristics such as volume, equalization, audio image (e.g., the configuration of the audio signals to produce audio output that appears to a user to originate from one or more defined locations), audio distribution among a plurality of speakers, et cetera. Likewise, the control signals may control vents, air conditioner, and/or heater of the climate control system 634. For example, the control signals may increase delivery of cooled air to a specific section of the cabin.

Control elements positioned on an outside of a vehicle (e.g., controls for a security system) may also be connected to the in-vehicle computing system 509, such as via intervehicle system communication module 622. The control elements of the vehicle control system 630 may be physically and permanently positioned on and/or in the vehicle for receiving user input. In addition to receiving control instructions from the in-vehicle computing system 509, the vehicle control system 630 may also receive input from one or more external devices 550 operated by the user, such as from the mobile device 528. This allows aspects of the vehicle systems 631 and vehicle control elements 661 to be controlled based on user input received from the external devices 550.

The in-vehicle computing system 509 may further include one or more antennas 606. The antennas 606 are shown as a single antenna, but may comprise one or more antennas in some embodiments. The in-vehicle computing system may obtain broadband wireless internet access via the antennas 606, and may further receive broadcast signals such as radio, television, weather, traffic, and the like. The in-vehicle computing system may receive positioning signals such as GPS signals via the antennas 606. The in-vehicle computing system may also receive wireless commands such as via the antennas 606 or via infrared or other means through appropriate receiving devices. In some embodiments, the antennas 606 may be included as part of the vehicle audio system 632 or the telecommunication system 636. Additionally, the antennas 606 may provide AM/FM radio signals to the external devices 550 (such as to the mobile device 528) via the external device interface 612.

One or more elements of the in-vehicle computing system 509 may be controlled by a user via the user interface 618. The user interface 618 may include a graphical user interface presented on a touch screen, such as the touch screen 508 of FIG. 5, and/or user-actuated buttons, switches, knobs, dials, sliders, et cetera. For example, user-actuated elements may include steering wheel controls, door and/or window controls, instrument panel controls, audio system settings, climate control system settings, and the like. A user may also interact with one or more applications of the in-vehicle computing system 509 and the mobile device 528 via the user interface 618. In addition to receiving a user's vehicle setting preferences on the user interface 618, vehicle settings selected by an in-vehicle control system may be displayed to a user on the user interface 618. Notifications and other messages (e.g., received messages), as well as navigational assistance, may be displayed to the user on a display of the user interface. User preferences/information and/or responses to presented messages may be performed via user input to the user interface.

In some examples, the vehicle 502 may operate in one or more autonomous modes where some or all vehicle operations (e.g., acceleration, braking, steering) are controlled automatically without driver input. To facilitate autonomous or semi-autonomous operation, the vehicle may utilize output from the various sensors described herein (e.g., a radar sensor, a machine vision camera) to identify and track vehicles, pedestrians, bicyclists, rough roads, potholes, and other objects and report those objects to an autonomous control module. The autonomous control module may be part of the vehicle control system 630.

For example, the radar sensor may communicate with the autonomous control module over a vehicle data network such as the CAN bus, Flexray, or Ethernet. The machine vision camera may also identify lane markings and report the curvature of the road ahead to the autonomous control module. It should be understood that the radar sensor and machine vision camera here are exemplary to represent any number of possible sensors. In practice, a vehicle may have many more sensors than the two discussed herein. For example, vehicles may utilize multiple radar sensors and cameras which face in different directions, have different ranges, and have different fields of view.

The autonomous control module may process information received from the vehicle sensors (e.g., the radar sensor and the machine vision camera) and calculate vehicle control actions in response thereto. The autonomous control module may communicate with the vehicle's brakes to initiate braking if the sensor data indicates the presence of an object ahead and in the path of the host vehicle. The autonomous control module may also communicate with the vehicle's steering system to apply torque to the steering and prevent the vehicle from drifting out of the lane or to steer around an object in the path of the vehicle.

One or more elements of the in-vehicle computing system 509 and the vehicle control system 630 may have ECUs associated with them, as described in relation to FIGS. 1A through 4. For example, the methods and systems regarding power state management of ECUs of the vehicle 502 may apply to associated ECUs included in the in-vehicle computing system 509 and the vehicle control system 630. In one example, the telecommunication system 636 may include one or more TCUs, including all of the attendant functions associated therewith, as described in relation to FIGS. 1A, 1C, and 2. In another example, the steering wheel controls 662 may include an electric power steering control unit therein, for example as part of an electric power steering system. In yet another example, one or more components of the in-vehicle computing system 509 may include a cockpit ECU, such as for control of one or more of the antennas 606, the external device interface 612, and others. However, the aforementioned examples of ECUs in the in-vehicle computing system 509 and the vehicle control system 630 may be understood to be non-limiting, and many more example ECUs may be included therein.

In some embodiments, the ECUs may include internal processors, and/or may be comprise or be controlled via the one or more processors of the in-vehicle computing system 509. For example, commands received at one or more ECUs of the vehicle 502 via a wireless communications link (e.g., at the antennas 606 and/or the telecommunication system 636) may be received at the one or more processors of the operating system processor 614 and/or the interface processor 620 of the in-vehicle computing system 509, and may be relayed to one or more ECUs thereby. Further, memory of state machines for ECUs of the vehicle 502 may in some embodiments be included in internal non-transitory memories of respective ECUs, and in other embodiments may be at least partially stored in the non-volatile storage device 619B and/or the non-volatile storage device 608, with modification of state machines for ECUs then implemented via the operating system processor 614 and/or the interface processor 620.

In this way, by utilizing a command-based framework for power management of state machines of ECUs of a vehicle, power usage of ECUs in the vehicle may be minimized. By updating power states, trigger conditions, guard conditions, and action of ECUs of the vehicle in response to commands received from the operator or manager of the vehicle fleet via a wireless communications link, management of the power states of ECUs of the vehicle may be done adaptively and in real time in response to the riding data of the vehicle that is provided to the operator or manager of the vehicle fleet. For example, riding data of the vehicle that is sent to the operator or manager of the vehicle fleet via the wireless communications link may be analyzed for usage patterns, which may then determine further commands to be sent to the vehicle for the addition/removal/modification of one or more power states, trigger conditions, guard conditions, and actions of state machines of ECUs of the vehicle. The technical effect of utilizing a unified command-based framework for the configuration of state machines of ECUs of a vehicle is that power states of ECUs and transitions therebetween may be modified without the use of a software-update framework, which may be costly and time inefficient for the operator or manager of the vehicle fleet. Further, by providing a unified command-based framework for the configuration of state machines of ECUs of a vehicle, the operator or manager of the vehicle fleet may provide a command-based framework that is applicable over a wide range of vehicle makes and models, and may be utilized in for support of one or more OEMs.

The disclosure provides support for a method comprising: receiving a command in a language for establishing parts of state machines, identifying the command as being for a configuration of state machine transitions, based on a value of a command-type field of the command, and for commands identified as being for the configuration of state machine transitions, configuring a transition of a state machine based on a value in a start-state field of the command, a value in an end-state field of the command, and at least one of: one or more values in a trigger-condition field of the command, zero or more values in a guard-condition field of the command, and zero or more values in an action field of the command. In a first example of the method, the identifying of the command as being for the configuration of state machine transitions comprises detecting that the value of the command-type field of the command matches a predetermined value from a table of commands that corresponds with the configuration of state machine transitions. In a second example of the method, optionally including the first example, the state machine is a state machine of a vehicle. In a third example of the method, optionally including one or both of the first and second examples, the command is received over a wireless communications link from a remote computing system. In a fourth example of the method, optionally including one or more or each of the first through third examples comprising: generating a transmission for the wireless communications link, the transmission carrying at least one of: vehicle-make information, vehicle-model information, and usage-model information. In a fifth example of the method, optionally including one or more or each of the first through fourth examples comprising: identifying a second command as being for the configuration of one of: available states, available trigger conditions, available guard conditions, and available actions. In a sixth example of the method, optionally including one or more or each of the first through fifth examples comprising: adding, for commands identified as being for the configuration of available states, an entry to a table of available states corresponding with a value in another field of the command. In a seventh example of the method, optionally including one or more or each of the first through sixth examples comprising: adding, for commands identified as being for the configuration of available trigger conditions, an entry to a table of available trigger conditions corresponding with a value in another field of the command. In an eighth example of the method, optionally including one or more or each of the first through seventh examples comprising: adding, for commands identified as being for the configuration of available guard conditions, an entry to a table of available guard conditions corresponding with a value in another field of the command. In a ninth example of the method, optionally including one or more or each of the first through eighth examples comprising: adding, for commands identified as being for the configuration of available actions, an entry to a table of available actions corresponding with a value in another field of the command.

The disclosure also provides support for a system for a configuration of power management state machines for a vehicle, comprising: one or more processors, and a non-transitory memory having executable instructions that, when executed, cause the one or more processors to: receive a command from a wireless communications link, the command being in a language for establishing parts of power management state machines, and the command being based upon one or more of: a make of the vehicle, a model of the vehicle, and a usage-model of the vehicle, identify whether the command is for the configuration of state machine transitions, based on a value of a command-type field of the command, and for commands identified as being of a type for configuration of transitions, configure a transition of a state machine based on a value in a start-state field of the command, a value in an end-state field of the command, and at least one of: one or more values in a trigger-condition field of the command, zero or more values in a guard-condition field of the command, and zero or more values in an action field of the command. In a first example of the system, the command includes a field to identify one or more processors within a vehicular network by unique addresses. In a second example of the system, optionally including the first example, the one or more processors includes one or more electronic control units (ECUs) of the vehicle, and wherein each ECU of one or more ECUs is configured to operate within a discrete set of power states, the discrete set of power states configured according to hardware specifications of each ECU. In a third example of the system, optionally including one or both of the first and second examples, the start-state field and the end-state field of the command for the configuration of state machine transitions are power states selected from the discrete set of power states of the one or more ECUs. In a fourth example of the system, optionally including one or more or each of the first through third examples comprising: identifying a second command received from the wireless communications link as being for the configuration of one of: available power states, available trigger conditions, available guard conditions, and available actions, based on a value of the command-type field of the second command. In a fifth example of the system, optionally including one or more or each of the first through fourth examples, values in one or more fields for available power states, available trigger conditions, available guard conditions, and available actions are added to a table of available power states, a table or available trigger conditions, a table of available guard conditions, and a table of available actions, respectively, the available power states selected from the discrete set of power states, the available trigger conditions selected from a discrete set of trigger conditions, the available guard conditions selected from a discrete set of guard conditions, and the available actions selected from a discrete set of action conditions. In a sixth example of the system, optionally including one or more or each of the first through fifth examples, each of the discrete set of trigger conditions, the discrete set of guard conditions, and the discrete set of actions are configured according to the hardware specifications of each ECU, and wherein each of the discrete set of trigger conditions, guard conditions, actions, and power states are selected from a master table.

The disclosure also provides support for a system for a configuration of power management state machines for a remote vehicle, comprising: a wireless communications link with a vehicle, one or more processors, and a non-transitory memory having executable instructions that, when executed, cause the one or more processors to: prepare one or more first commands in a language for establishing parts of power management state machines of vehicles, the one or more first commands including command-type fields that have predetermined values from a table of commands that correspond with one or more of: the configuration of available states, the configuration of available trigger conditions, the configuration of available guard conditions, and the configuration of available actions, and prepare one or more second commands in the language for establishing parts of power management state machines of vehicles, the one or more second commands including command-type fields that have a predetermined value from the table of commands that corresponds with the configuration of state machine transitions, wherein the first commands and the second commands are for transmission to the vehicle across the wireless communications link, and wherein the one or more first commands and the one or more second commands are based upon at least one of: a make of the vehicle, a model of the vehicle, and a usage-model of the vehicle. In a first example of the system, the one or more processors include one or more electronic control units (ECUs) of a vehicular network of the remote vehicle, including a telematics control unit (TCU), and wherein commands of the one or more first commands and the one or more second commands contain unique addresses, the unique addresses identifying ECUs of the one or more ECUs of the remote vehicle. In a second example of the system, optionally including the first example, upon receiving the one or more first commands at the remote vehicle, values of available states, available trigger conditions, available guard conditions, and available actions of the one or more first commands are added to each of a table of available states, a table of available trigger conditions, a table of available guard conditions, and a table of available actions, respectively, each of the table of available states, the table of available trigger conditions, the table of available guard conditions, and the table of available actions being configured for and stored in a memory of a specific ECU.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 509 described with reference to FIGS. 5 and 6. The methods may be performed by executing stored instructions with one or more logic devices (e.g., processors) in combination with one or more additional hardware elements, such as storage devices, memory, hardware network interfaces/antennas, switches, actuators, clock circuits, et cetera. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," et cetera are used merely as labels, and are not intended to impose numerical requirements or a particular positional order on their objects. The following claims particularly point out subject matter from the above disclosure that is regarded as novel and non-obvious.

The invention claimed is:

1. A method comprising:

receiving, at one or more electronic control units (ECUs) of a vehicle, a command in a language for establishing parts of state machines;

identifying the command as being for a configuration of state machine transitions, based on a value of a command-type field of the command;

for commands identified as being for the configuration of state machine transitions, configuring a transition of a power management state machine of the one or more ECUs based on a value in a start-state field of the command, a value in an end-state field of the command, and at least one of: one or more values in a trigger-condition field of the command; zero or more values in a guard-condition field of the command; and zero or more values in an action field of the command;

monitoring for one or more trigger conditions indicated by the one or more values in the trigger-condition field; and responsive to the one or more trigger conditions being satisfied, performing one or more actions indicated by the action field of the command and transitioning the one or more ECUs from a power state indicated by the value in the start-state field to a power state indicated by the value in the end-state field, the one or more actions comprising at least one of: turning off an application processor, suspending the application processor to random access memory, turning off a communication processor, placing the communication processor in a dormant state, and turning off an audio codec.

2. The method of claim 1, wherein the identifying of the command as being for the configuration of state machine transitions comprises detecting that the value of the command-type field of the command matches a predetermined value from a table of commands that corresponds with the configuration of state machine transitions;

wherein the command further comprises a first count field indicating a number N1 of trigger conditions and preceding the trigger-condition field, a second count field indicating a number N2 of guard conditions and preceding the guard-condition field, and a third count field indicating a number N3 of actions and preceding the action field; and wherein the configuring of the transition comprises determining the number N1 from the first count field and selecting N1 trigger conditions from a table of available trigger conditions according to the one or more values in the trigger-condition field, determining the number N2 from the second count field and selecting N2 guard conditions from a table of available guard conditions according to the zero or more values in the guard-condition field, and determining the number N3 from the third count field and selecting N3 actions from a table of available actions according to the zero or more values in the action field.

3. The method of claim 1, wherein the value in the start-state field and the value in the end-state field indicate power states selected from a discrete set of power states of the one or more ECUs, the discrete set of power states being configured according to hardware specifications of the one or more ECUs and being maintained in a master table for a vehicular network of the vehicle; and wherein a table of available power states of the one or more ECUs includes a subset of the discrete set of power states.

4. The method of claim 3, wherein the command is received over a wireless communications link from a remote computing system; wherein the one or more ECUs include a telematics control unit (TCU) powered from a main battery of the vehicle via a Klemme 30 (KL30) connection; and comprising configuring a first additional transition of the power management state machine from an active power state to a backup battery active power state responsive to a trigger condition of the TCU being disconnected from the KL30 connection, powering the TCU from a backup battery of the vehicle while in the backup battery active power state, configuring a second additional transition of the power management state machine from a backup battery standby power state to the backup battery active power state responsive to a trigger condition of a modem wakeup comprising an emergency call (eCall) callback from a public-safety answering point, and, while the TCU is disconnected from the KL30 connection and in the backup battery active power state, establishing an audio path and transmitting global positioning system (GPS) location details.

5. The method of claim 4, comprising: generating a transmission for the wireless communications link, the transmission carrying at least one of: vehicle-make information, vehicle-model information, and usage-model information.

6. The method of claim 1, comprising: identifying a second command as being for the configuration of one of: available states, available trigger conditions, available guard conditions, and available actions.

7. The method of claim 6, comprising: adding, for commands identified as being for the configuration of available states, an entry to a table of available states corresponding with a value in another field of the command, wherein the entry added to the table of available states is a low power active power state intermediate a standby power state and an active power state of the one or more ECUs; and comprising configuring a transition from the standby power state to the low power active power state responsive to a trigger condition of a wakeup from the standby power state, configuring a transition from the low power active power state to the standby power state responsive to a trigger condition of the wakeup being invalid, and configuring a transition from the low power active power state to the active power state responsive to the wakeup being valid.

8. The method of claim 6, comprising: adding, for commands identified as being for the configuration of available trigger conditions, an entry to a table of available trigger conditions corresponding with a value in another field of the command.

9. The method of claim 6, comprising: adding, for commands identified as being for the configuration of available guard conditions, an entry to a table of available guard conditions corresponding with a value in another field of the command.

10. The method of claim 6, comprising: adding, for commands identified as being for the configuration of available actions, an entry to a table of available actions corresponding with a value in another field of the command.

11. A system for a configuration of power management state machines for a vehicle, comprising:

one or more processors; and a non-transitory memory having executable instructions that, when executed, cause the one or more processors to:

receive a command from a wireless communications link, the command being in a language for establishing parts of power management state machines, and the command being based upon one or more of: a make of the vehicle, a model of the vehicle, and a usage-model of the vehicle;

identify whether the command is for the configuration of state machine transitions, based on a value of a command-type field of the command;

for commands identified as being of a type for configuration of transitions, configure a transition of a state machine based on a value in a start-state field of the command, a value in an end-state field of the command, and at least one of: one or more values in a trigger-condition field of the command; zero or more values in a guard-condition field of the command; and zero or more values in an action field of the command;

monitor for one or more trigger conditions indicated by the one or more values in the trigger-condition field; and responsive to the one or more trigger conditions being satisfied, perform one or more actions indicated by the action field of the command and transition from a power state indicated by the value in the start-state field to a power state indicated by the value in the end-state field, the one or more actions comprising at least one of: turning off an application processor, suspending the application processor to random access memory, turning off a communication processor, placing the communication processor in a dormant state, and turning off an audio codec.

12. The system of claim 11, wherein the command includes a field to identify one or more processors within a vehicular network by unique addresses.

13. The system of claim 11, wherein the one or more processors includes one or more electronic control units (ECUs) of the vehicle; and wherein each ECU of one or more ECUs is configured to operate within a discrete set of power states, the discrete set of power states configured according to hardware specifications of each ECU.

14. The system of claim 13, wherein the start-state field and the end-state field of the command for the configuration of state machine transitions are power states selected from the discrete set of power states of the one or more ECUs.

15. The system of claim 14, comprising: identifying a second command received from the wireless communications link as being for the configuration of one of: available power states, available trigger conditions, available guard conditions, and available actions, based on a value of the command-type field of the second command.

16. The system of claim 15, wherein values in one or more fields for available power states, available trigger conditions, available guard conditions, and available actions are added to a table of available power states, a table of available trigger conditions, a table of available guard conditions, and a table of available actions, respectively, the available power states selected from the discrete set of power states, the available trigger conditions selected from a discrete set of trigger conditions, the available guard conditions selected from a discrete set of guard conditions, and the available actions selected from a discrete set of action conditions.

17. The system of claim 16, wherein each of the discrete set of trigger conditions, the discrete set of guard conditions, and the discrete set of actions are configured according to the hardware specifications of each ECU; and wherein each of the discrete set of trigger conditions, guard conditions, actions, and power states are selected from a master table.

18. A system for a configuration of power management state machines for a remote vehicle, comprising:

a wireless communications link with a vehicle;

one or more processors; and a non-transitory memory having executable instructions that, when executed, cause the one or more processors to:

prepare one or more first commands in a language for establishing parts of power management state machines of vehicles, the one or more first commands including command-type fields that have predetermined values from a table of commands that correspond with one or more of: the configuration of available states, the configuration of available trigger conditions, the configuration of available guard conditions, and the configuration of available actions; and prepare one or more second commands in the language for establishing parts of power management state machines of vehicles, the one or more second commands including command-type fields that have a predetermined value from the table of commands that corresponds with the configuration of state machine transitions, wherein the first commands and the second commands are for transmission to the vehicle across the wireless communications link;

wherein the one or more first commands and the one or more second commands are based upon at least one of: a make of the vehicle, a model of the vehicle, and a usage-model of the vehicle;

wherein each of the one or more first commands and the one or more second commands includes an address field uniquely identifying an electronic control unit (ECU) among a plurality of ECUs of a vehicular network of the vehicle; and wherein the available states of the one or more first commands are selected from a discrete set of power states of the identified ECU, the discrete set of power states being configured according to hardware specifications of the identified ECU and being maintained in a master table for the vehicular network.

19. The system of claim 18, wherein the one or more processors include one or more electronic control units (ECUs) of a vehicular network of the remote vehicle, including a telematics control unit (TCU); and wherein commands of the one or more first commands and the one or more second commands contain unique addresses, the unique addresses identifying ECUs of the one or more ECUs of the remote vehicle.

20. The system of claim 19, wherein upon receiving the one or more first commands at the remote vehicle, values of available states, available trigger conditions, available guard conditions, and available actions of the one or more first commands are added to each of a table of available states, a table of available trigger conditions, a table of available guard conditions, and a table of available actions, respectively, each of the table of available states, the table of available trigger conditions, the table of available guard conditions, and the table of available actions being configured for and stored in a memory of a specific ECU.

* * * * *